(12) United States Patent
Kitahara et al.

(10) Patent No.: US 11,323,015 B2
(45) Date of Patent: *May 3, 2022

(54) ACTUATOR

(71) Applicant: NIDEC SANKYO CORPORATION, Nagano (JP)

(72) Inventors: Hiroshi Kitahara, Nagano (JP); Tadashi Takeda, Nagano (JP); Masao Tsuchihashi, Nagano (JP)

(73) Assignee: NIDEC SANKYO CORPORATION, Nagano (JP)

( * ) Notice: Subject to any disclaimer, the term of this patent is extended or adjusted under 35 U.S.C. 154(b) by 302 days.

This patent is subject to a terminal disclaimer.

(21) Appl. No.: 16/499,306

(22) PCT Filed: Mar. 23, 2018

(86) PCT No.: PCT/JP2018/011587
§ 371 (c)(1),
(2) Date: Sep. 29, 2019

(87) PCT Pub. No.: WO2018/180948
PCT Pub. Date: Oct. 4, 2018

(65) Prior Publication Data
US 2020/0059145 A1 Feb. 20, 2020

(30) Foreign Application Priority Data
Mar. 30, 2017 (JP) .............................. JP2017-068658

(51) Int. Cl.
*H02K 33/10* (2006.01)
(52) U.S. Cl.
CPC ..................... *H02K 33/10* (2013.01)
(58) Field of Classification Search
CPC ........ H02K 33/02; H02K 33/04; H02K 33/18; H02K 33/06; H02K 33/08; H02K 33/10;
(Continued)

(56) References Cited

U.S. PATENT DOCUMENTS

| 2013/0313919 | A1 | 11/2013 | Nakamura |
| 2017/0310203 | A1 | 10/2017 | Takeda et al. |
| 2021/0194342 | A1* | 6/2021 | Kitahara ................. B06B 1/045 |

FOREIGN PATENT DOCUMENTS

| CN | 203193471 | 9/2013 |
| CN | 103973070 | 8/2014 |

(Continued)

OTHER PUBLICATIONS

"International Search Report (Form PCT/ISA/210) of PCT/JP2018/011587," dated May 22, 2018, with English translation thereof, pp. 1-4.

(Continued)

*Primary Examiner* — Tulsidas C Patel
*Assistant Examiner* — Robert E Mates
(74) *Attorney, Agent, or Firm* — JCIPRNET

(57) ABSTRACT

An actuator is provided. In order to reduce the planar area of an actuator, a first magnetic drive circuit and a third magnetic drive circuit that vibrate a movable body in an X direction with respect to a support are provided respectively on both sides, in a Z direction, of a second magnetic drive circuit that vibrates the movable body in a Y direction with respect to the support. The movable ranges, in the X direction and the Y direction, of the movable body with respect to the support are regulated by a stopper mechanism constituted between a first magnet and a first coil holder holding a first coil, a stopper mechanism constituted between a second magnet and a second coil holder holding a second coil, and a stopper mechanism constituted between a third magnet and a third coil holder holding a third coil.

20 Claims, 17 Drawing Sheets

(58) Field of Classification Search
CPC ........ H02K 33/16; H02K 35/02; H02K 33/00; H02K 1/34; H02K 33/12; H02K 7/065; H02K 2201/18; B06B 1/045
See application file for complete search history.

(56) References Cited

FOREIGN PATENT DOCUMENTS

| CN | 205490070 | 8/2016 |
|---|---|---|
| CN | 106104992 | 11/2016 |
| CN | 205864118 | 1/2017 |
| JP | H03296112 | 12/1991 |
| JP | 2003010783 | 1/2003 |
| JP | 2011250637 | 12/2011 |
| JP | 2013243883 | 12/2013 |
| JP | 2016127789 | 7/2016 |
| WO | 2016167297 | 10/2016 |

OTHER PUBLICATIONS

"Office Action of China Counterpart Application", dated Nov. 4, 2020, with English translation thereof, p. 1-p. 10.

\* cited by examiner

ACTUATOR

CROSS-REFERENCE TO RELATED APPLICATION

This application is a 371 application of the international PCT application serial no. PCT/JP2018/011587, filed on Mar. 23, 2018, which claims the priority benefits of Japan application no. 2017-068658, filed on Mar. 30, 2017. The entirety of each of the abovementioned patent applications is hereby incorporated by reference herein and made a part of this specification.

TECHNICAL FIELD

The present invention relates to an actuator for generating various vibrations.

BACKGROUND ART

As an apparatus for generating vibration by a magnetic drive circuit, there has been proposed an actuator having a support provided with a magnet, a movable body having a coil opposed to the magnet, and an elastic member disposed between the movable body and the support (refer to Patent Literature 1). Further, in the actuator described in Patent Literature 1, in a common plate member (coil holder) having the plate thickness direction oriented in the first direction, two first coils are provided at positions spaced apart from each other in a second direction orthogonal to the first direction, and two second coils are provided at positions spaced apart from each other in a third direction orthogonal to the first direction and the second direction. Also, in the support, a first magnet held by a first magnet holder is disposed on both sides in the first direction with respect to the first coil, and a second magnet is disposed on a second magnet holder on both sides in the first direction with respect to the second coil. Accordingly, the first coil and the first magnet constitute a first magnetic drive circuit for vibrating the movable body in the second direction, and the second coil and the second magnet constitute a second magnetic drive circuit for vibrating the movable body in the third direction.

In addition, the movable range of the movable body in the second direction and the third direction is regulated by a stopper mechanism constituted by a columnar portion provided in the coil holder and the magnet holder on the outer side in the second direction and the outer side in the third direction with respect to the movable body.

CITATION LIST

Patent Literature

[Patent Literature 1] Japanese Unexamined Patent Publication No. 2016-127789

SUMMARY

Technical Problems

As in the actuator described in Patent Literature 1, when the stopper mechanism is configured by the coil holder that holds the coil and the magnet holder that holds the magnet, it is necessary to provide the stopper mechanism on the outside of the movable body in the second direction and the third direction. Therefore, there is a problem that the planar area of the actuator becomes large.

In view of the above problems, it is an object of the present invention to provide an actuator capable of reducing the planar area.

Solutions to Problems

In order to solve the above problem, an actuator according to the present invention includes a support, a movable body movable with respect to the support, a first magnetic drive circuit which generates a driving force to drive the movable body in a second direction orthogonal to a first direction, and a second magnetic drive circuit which generates a driving force to drive the movable body in a third direction orthogonal to the first direction and crossing the second direction. The first magnetic drive circuit includes a first coil held by a first coil holder provided on one side member of the support and the movable body, and a first magnet held by other side member of the support and the movable body and facing, in the first direction, a first effective side portion extending in the third direction of the first coil. The second magnetic drive circuit includes a second coil held by a second coil holder provided on the one side member, and a second magnet held by the other side member and facing, in the first direction, a second effective side portion extending in the second direction of the second coil. The first coil holder includes a first stopper portion facing the first magnet in the third direction to define a movable range of the movable body in the third direction, and the second coil holder includes a second stopper portion facing the second magnet in the second direction to define a movable range of the movable body in the second direction.

In the present invention, the movable range of the movable body in the second direction and the third direction relative to the support is regulated by a stopper mechanism provided between the first coil holder and the first magnet and a stopper mechanism provided between the second coil holder and the second magnet, and such stopper mechanisms can be provided at positions overlapping with the first magnetic drive circuit and the first magnetic drive circuit in the first direction. Therefore, it is possible to reduce the planar area of the actuator when viewed from the first direction. Further, the first magnet used for the first magnetic drive circuit for driving the movable body in the second direction has a dimension in the third direction shorter than the dimension in the second direction. Therefore, the stopper mechanism to regulate the movable range of the movable body in the third direction is configured by utilizing the space on both sides of the first magnet in the third direction. Further, the second magnet used for the second magnetic drive circuit for driving the movable body in the third direction has a dimension in the second direction shorter than the dimension in the third direction. Therefore, the stopper mechanism to regulate the movable range of the movable body in the second direction is configured by utilizing the space on both sides in the second direction of the second magnet. Therefore, it is easy to provide the stopper mechanisms at positions overlapping with the first magnetic drive circuit and the second magnetic drive circuit in the first direction.

The present invention can adopt an aspect in which the first coil holder includes a first frame portion including a first opening in which the first coil is housed, the first stopper portion includes a portion which projects from the first frame portion in the first direction and faces the first magnet in the third direction, the second coil holder includes a second frame portion including a second opening in which the second coil is housed, and the second stopper portion includes a portion which projects from the second frame portion in the first direction and faces the second magnet in the second direction. According to this aspect, it is possible to easily provide the first stopper portion and the second stopper portion to the first coil holder and the second coil holder. Specifically, the first coil used in the first magnetic drive circuit for driving the movable body in the second direction has a dimension in the third direction longer than the dimension in the second direction. Therefore, in the first frame portion, the distance between opposing portions in the third direction is larger than the dimension of the first magnet in the third direction. Accordingly, the first stopper portion can be easily provided in a portion projecting from the first frame portion. Further, the second coil used in the second magnetic drive circuit for driving the movable body in the third direction has a dimension in the second direction longer than the dimension in the third direction. Therefore, in the third frame portion, the distance between opposing portions in the second direction is larger than the dimension of the second magnet in the second direction. Accordingly, Therefore, the second stopper portion can be easily provided in a portion projecting from the second frame portion.

The present invention can adopt an aspect in which the first coil holder includes a first seat portion which projects from the first frame portion in the first direction and supports a first invalid side portion extending in the second direction of the first coil, the first stopper portion is constituted by a side end portion facing the first magnet of the first seat portion in the third direction, the second coil holder includes a second seat portion which projects from the second frame portion in the first direction and supports a second invalid side portion extending in the third direction of the second coil, and the second stopper portion is constituted by a side end portion facing the second magnet of the second seat portion in the second direction. According to this aspect, the first stopper portion can be constituted by using the first seat portion supporting the first coil, and the second stopper portion can be constituted by using the second seat portion supporting the second coil. Accordingly, it is possible to simplify the configuration of the first coil holder and the second coil holder.

The present invention can adopt an aspect in which the first stopper portion is positioned closer to the first magnet than an inner edge of the first invalid side portion, and the second stopper portion is positioned closer to the second magnet than an inner edge of the second invalid side portion. According to this aspect, when the movable body is driven, the first magnet and the second magnet do not easily come into contact with the lead-out portion on the winding start side of the first coil and the lead-out portion on the winding start side of the second coil. Therefore, disconnection of the first coil and disconnection of the second coil are less likely to occur.

The present invention can adopt an aspect in which the thickness of the first frame portion in the first direction is greater than the thickness of the first coil in the first direction, and the thickness of the second frame portion in the first direction is greater than the thickness of the second coil in the first direction. According to this aspect, it is difficult for the first coil to project in the first direction from the first frame portion, and it is difficult for the second coil to project in the second direction from the first frame portion. Therefore, a situation in which the first coil and the second coil abut on the first magnet and the second magnet and is disconnected is less likely to occur.

The present invention can adopt an aspect in which the first magnetic drive circuit is arranged to overlap with the second magnetic drive circuit in the first direction. According to this aspect, the size (planar area) of the actuator when viewed from the first direction is small.

The present invention can adopt an aspect in which a third magnetic drive circuit that generates a driving force to drive the movable body in the second direction is arranged to overlap with the second magnetic drive circuit on the opposite side to the first magnetic drive circuit with respect to the second magnetic drive circuit, the third magnetic drive circuit includes a third coil held by a third coil holder provided on the one side member, and a third magnet held by the other side member and facing, in the first direction, the third effective side portion extending in the third direction of the third coil, and the third coil holder includes a third stopper portion facing the third magnet in the third direction to define a movable range of the movable body in the third direction. According to this aspect, the first magnetic drive circuit and the third magnetic drive circuit for vibrating the movable body in the second direction are provided on both sides in the first direction of the second magnetic drive circuit that vibrates the movable body in the third direction. Therefore, when the movable body is vibrated in the second direction, a situation such as tilting of the movable body hardly occurs. Also, the stopper mechanism which regulates the movable range in the third direction of the movable body is provided on both sides in the first direction of the stopper mechanism which regulates the movable range in the second direction of the movable body. Accordingly, when the movable body excessively moves in the third direction, even when the stopper mechanism operates, a situation such as tilting of the movable body is less likely to occur.

The present invention can adopt an aspect in which the one side member is the support, and the other side member is the movable body.

The present invention can adopt an aspect in which the actuator further includes between the movable body and the support, a first elastic member in contact with both the movable body and a portion of the support opposed to the movable body on one side in the first direction; and a second elastic member in contact with both the movable body and a portion of the support opposite to the movable body on the other side in the first direction. According to this aspect, when the movable body vibrates in the second direction and the third direction with respect to the support, the viscoelastic member deforms in a shearing direction orthogonal to the expansion and contraction direction. Therefore, since the viscoelastic member deforms in a range in which the linearity is high, it is possible to obtain a vibration characteristic with good linearity.

The present invention can adopt an aspect in which each of the first elastic member and the second elastic member are adhered to the support and the movable body. According to this aspect, since the viscoelastic member reliably follows the movement of the movable body, the resonance of the movable body can be effectively prevented.

The present invention can adopt an aspect in which each of the first elastic member and the second elastic member is in a compressed state in the first direction between the support and the movable body. According to this aspect, since the viscoelastic member reliably follows the movement of the movable body, the resonance of the movable body can be effectively prevented.

The present invention can adopt an aspect in which the first elastic member and the second elastic member are each a viscoelastic member. Viscoelasticity is a property of both viscosity and elasticity, and is a property remarkably found in a polymeric material such as a gel member, a plastic member, a rubber member, or the like. Accordingly, various gel members such as silicone gel can be used as the viscoelastic member.

DESCRIPTION OF EMBODIMENTS

Embodiments of the present invention will be described with reference to the drawings. In the following description, three directions crossing each other will be described as an X direction, a Y direction, and a Z direction. The Z direction is a direction orthogonal to the X direction and the Y direction. Further, a description will be given in which X1 is given to one side in the X direction, X2 is given to the other side in the X direction, Y1 is given to one side in the Y direction, Y2 is given to the other side in the Y direction, Z1 is given to one side in the Z direction, and Z2 is given to the other side in the Z direction. Here, the X direction, the Y direction and the Z direction each have the following relationship with the direction in the present invention.

X direction="second direction" in the present invention.
Y direction="third direction" in the present invention.
Z direction="first direction" in the present invention.

FIRST EMBODIMENT (Overall Configuration)

Figure 1:
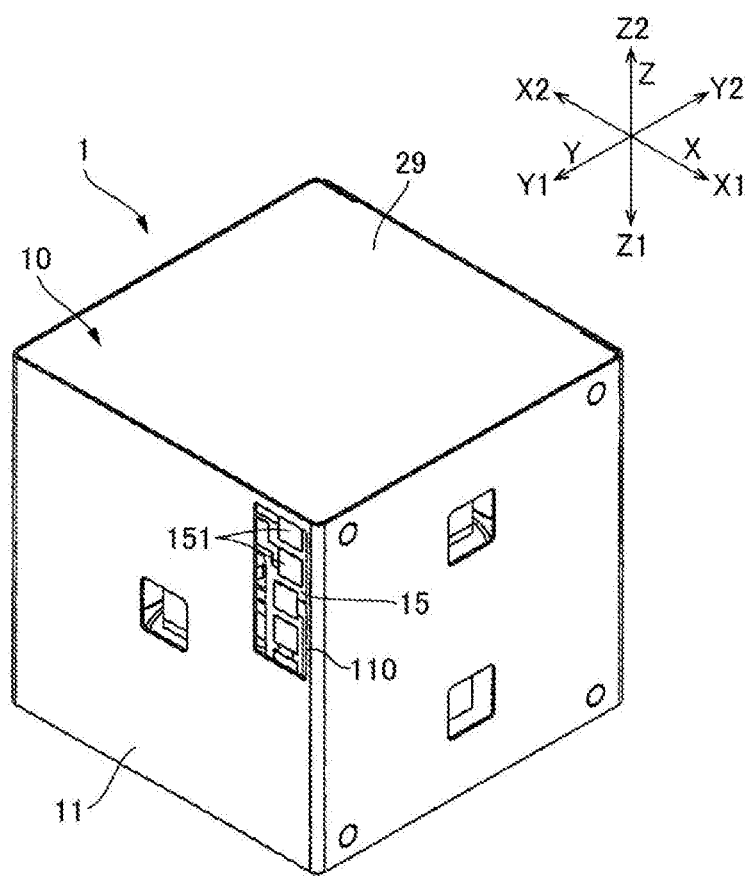
FIG. 1 is a perspective view of an actuator according to a first embodiment of the present invention.
Figure 2:
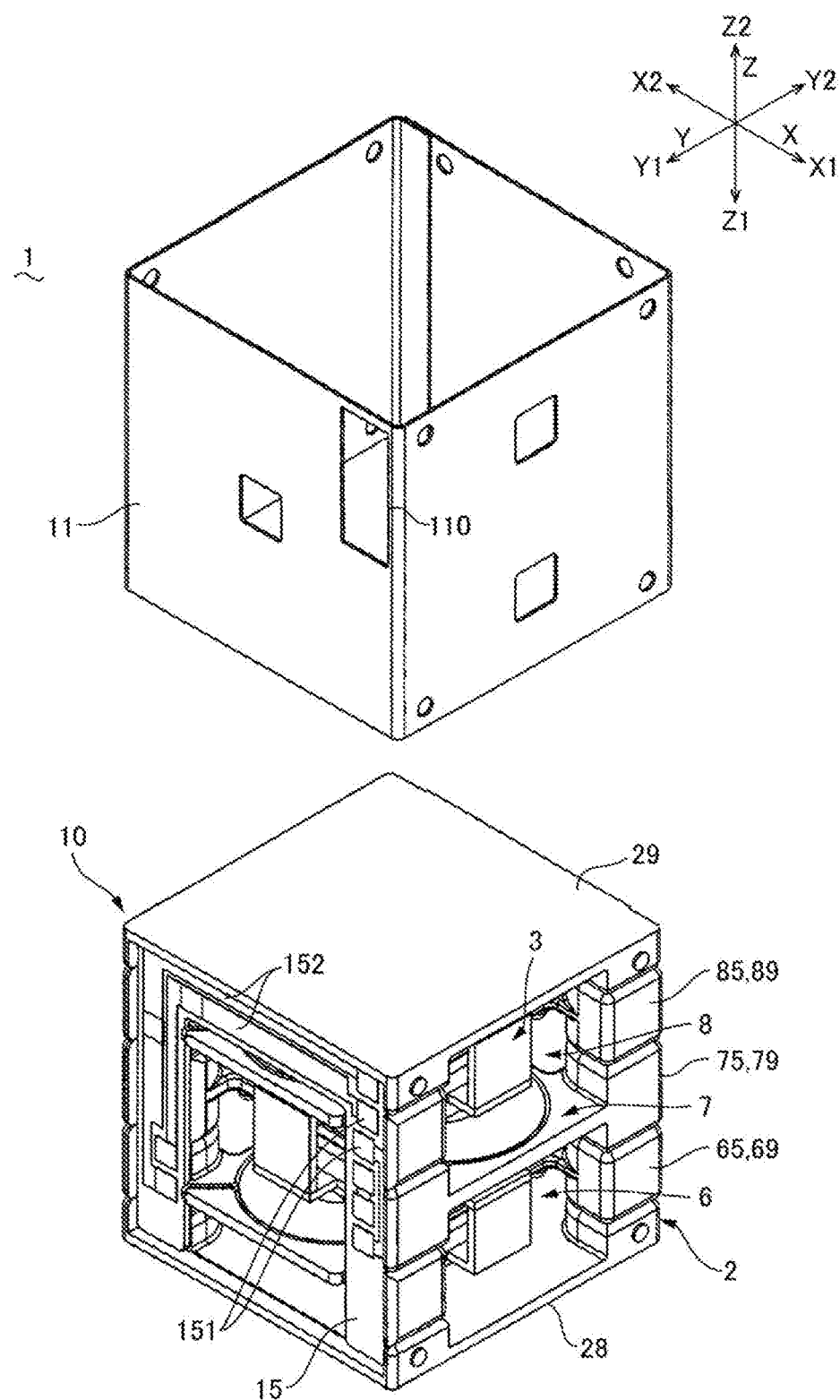
FIG. 2 is an exploded perspective view of the actuator in a state in which a cover shown in FIG. 1 is removed.
Figure 3:
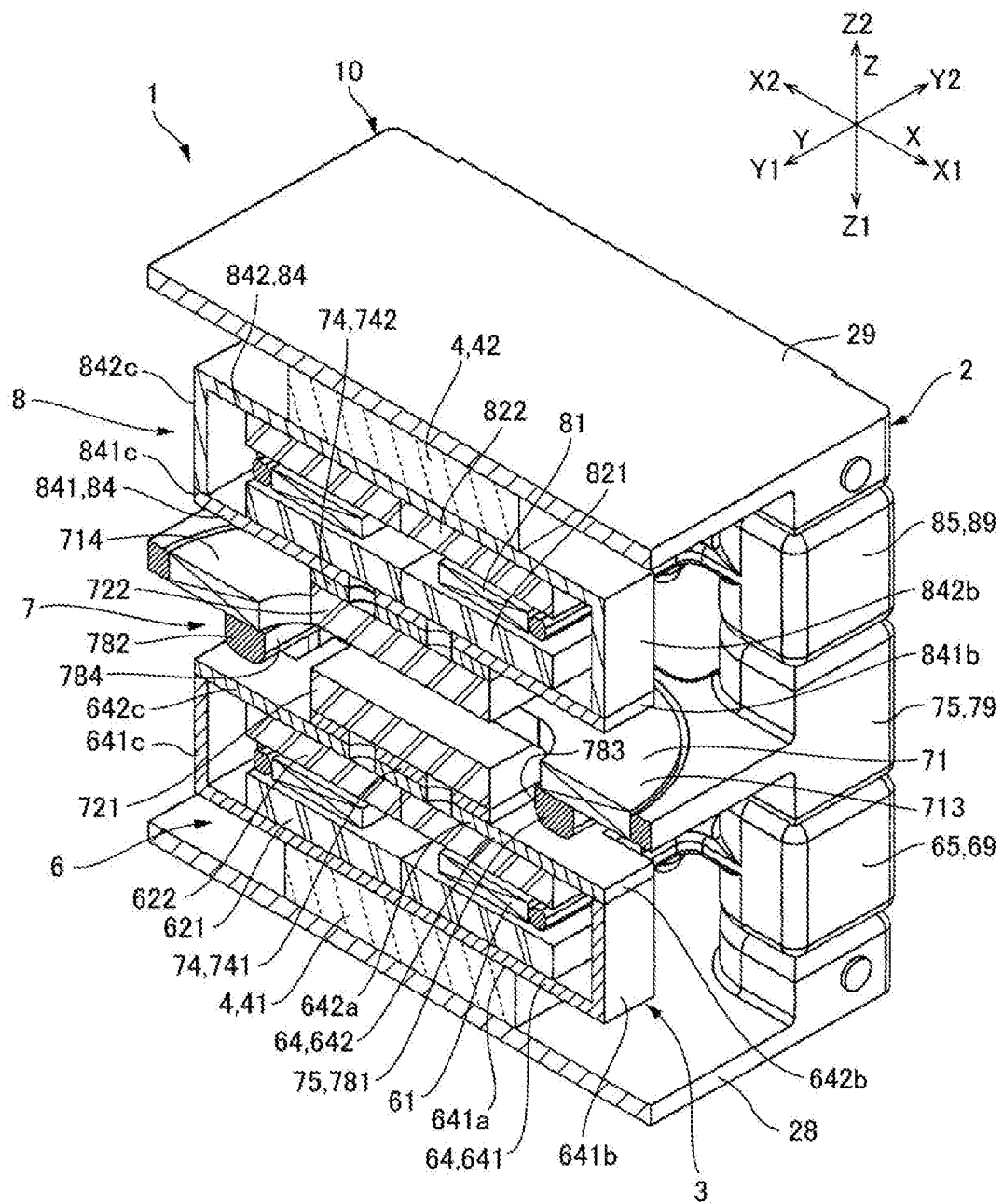
FIG. 3 is an explanatory diagram when the actuator shown in FIG. 1 is cut in a first direction and a second direction.
Figure 4:
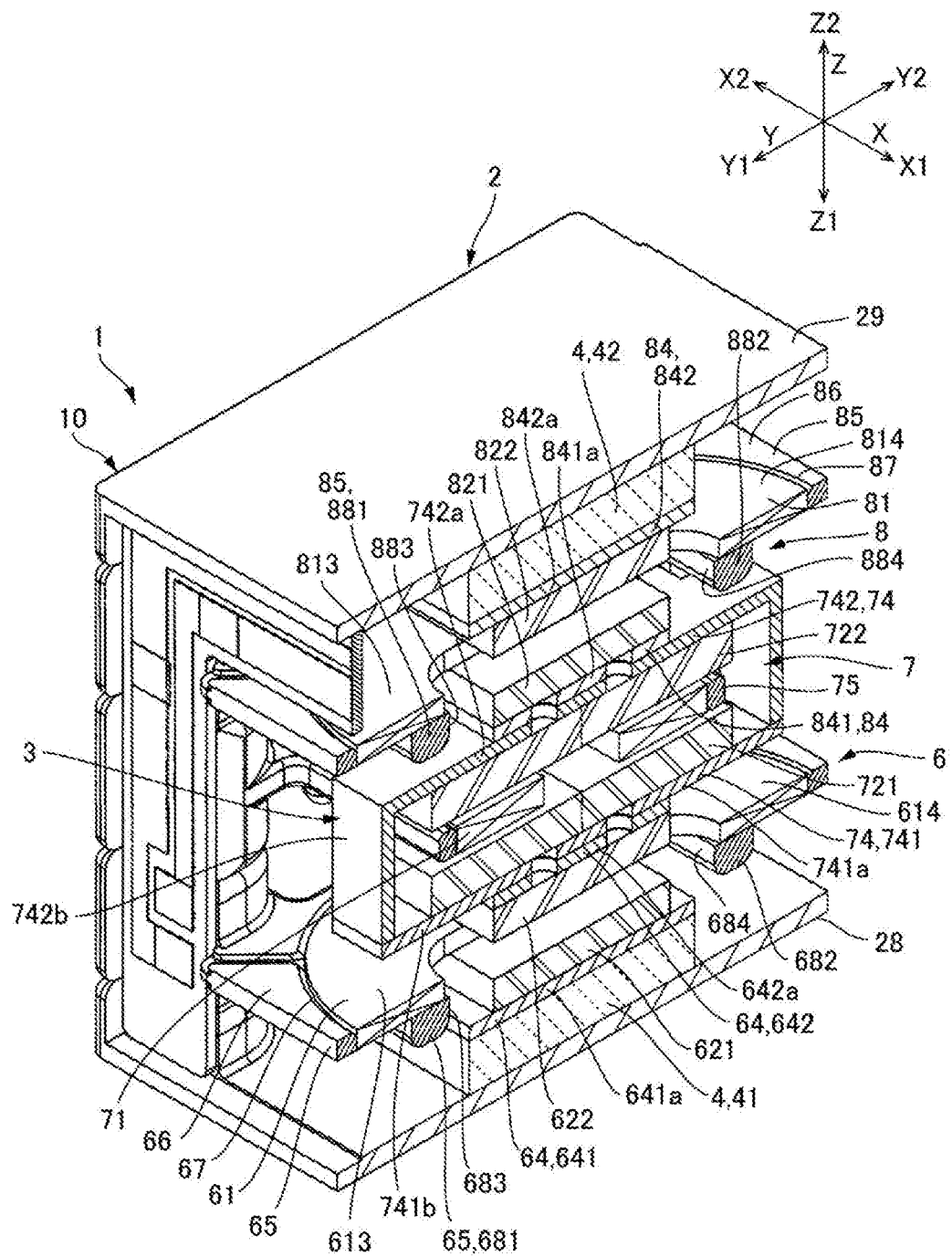
FIG. 4 is an explanatory diagram when the actuator shown in FIG. 1 is cut in the first direction and a third direction.
Figure 5:
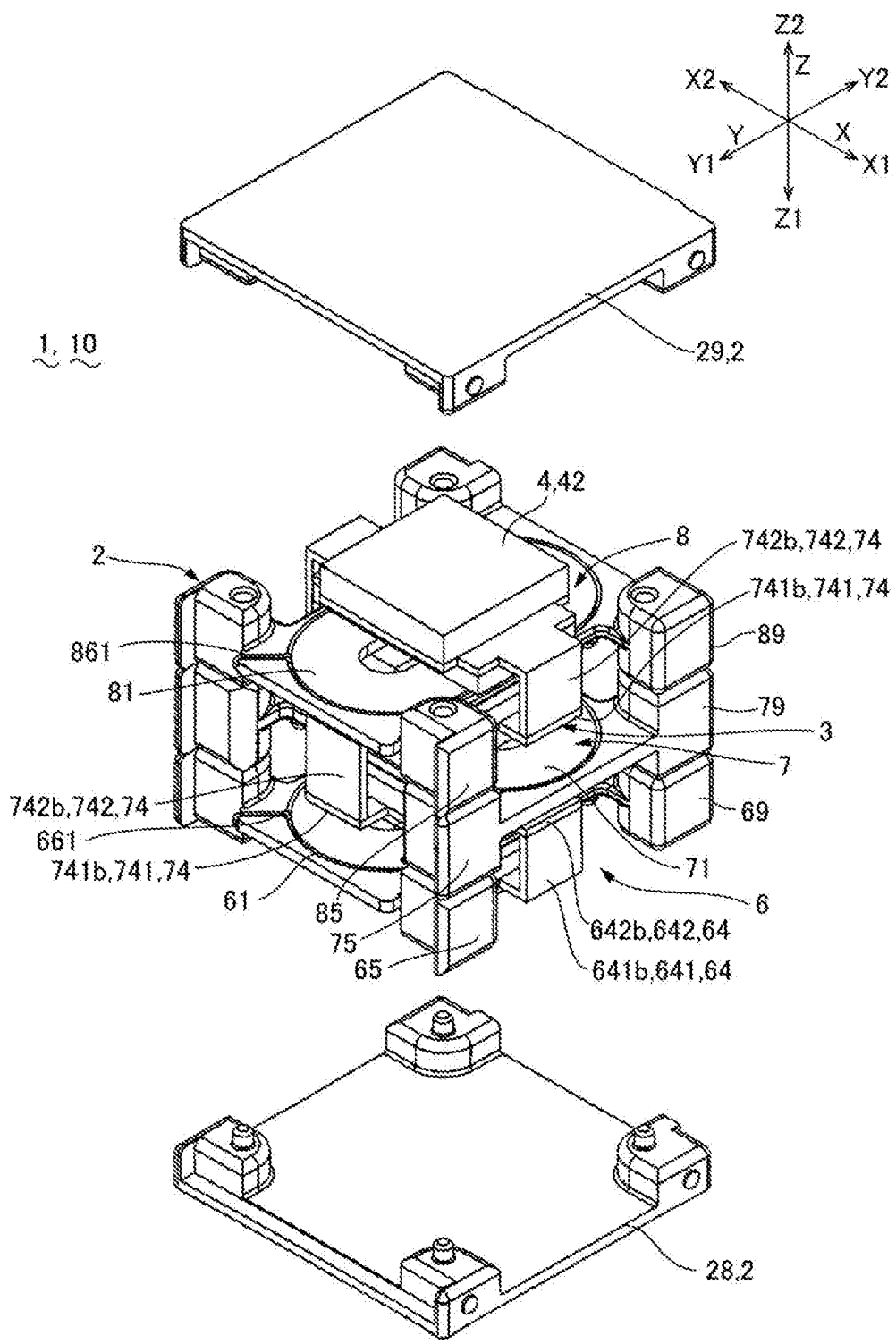
FIG. 5 is an exploded perspective view of the actuator in a state in which a first end plate and a second end plate shown in FIG. 2 are removed.

FIG. 1 is a perspective view of an actuator 1 according to a first embodiment of the present invention. FIG. 2 is an exploded perspective view of the actuator 1 in a state in which a cover 11 shown in FIG. 1 is removed. FIG. 3 is an explanatory diagram when the actuator 1 shown in FIG. 1 is cut in the Z direction and the X direction. FIG. 4 is an explanatory diagram when the actuator 1 shown in FIG. 1 is cut in the Z direction and the Y direction. FIG. 5 is an exploded perspective view of the actuator 1 in a state in which a first end plate 28 and a second end plate 29 shown in FIG. 2 are removed.

As shown in FIG. 1 and FIG. 2, the actuator 1 in the present embodiment includes: a cover 11 having a rectangular cylindrical shape opened in the Z direction, a body portion 10 having a rectangular parallelepiped shape housed inside the cover 11, and a wiring substrate 15 attached to a surface of the body portion 10 on one side Y1 in the Y direction. A plurality of electrodes 151 and a wiring pattern 152 are formed on the wiring substrate 15, and an end of a coil to be described later and a wiring member (not shown) extending from a driving device (not shown) are connected to the electrodes 151. For this reason, the cover 11 has an opening 110 for exposing the electrode 151 to which the wiring member is connected, among the plurality of electrodes 151.

As shown in FIG. 3, FIG. 4 and FIG. 5, the actuator 1 includes: a support 2, a movable body 3, and an elastic member 4 disposed between the movable body 3 and the support 2, and the movable body 3 is supported by the support 2 through the elastic member 4 to be movable in the Z direction, the X direction and the Y direction. Further, the actuator 1 has a plurality of magnetic drive circuits (first magnetic drive circuit 6, second magnetic drive circuit 7 and third magnetic drive circuit 8) for driving and vibrating the movable body 3 in the X direction and the Y direction with respect to the support 2.

The support 2 has a first end plate 28 at an end on one side Z1 in the Z direction and a second end plate 29 at an end on the other side Z2 in the Z direction. The first end plate 28 is opposed to the movable body 3 on the one side Z1 in the Z direction, and a first elastic member 41 (elastic member 4) is disposed between the movable body 3 and the first end plate 28. The second end plate 29 is opposed to the movable body 3 on the other side Z2 in the Z direction, and a second elastic member 42 (the elastic member 4) is disposed between the movable body 3 and the second end plate 29.

In the present embodiment, the elastic member 4 is a viscoelastic body having viscoelasticity, and, in the present embodiment a plate-like gel damper member is used as the elastic member 4 (the viscoelastic body). Both surfaces of the first elastic member 41 in the Z direction are respectively connected to the movable body 3 and the first end plate 28 by a method such as adhesion. Both surfaces of the second elastic member 42 in the Z direction are respectively connected to the movable body 3 and the second end plate 29 by a method such as adhesion. That is, the elastic member 4 is provided on the one side Z1 in the first direction Z with respect to the movable body 3 and on the other side Z2 in the first direction Z with respect to the movable body 3. Also, the elastic member 4 is disposed as a first elastic member 41 in contact with both of the movable body 3 and a portion of the support 2 (the first end plate 28) opposite to the movable body 3 on the one side Z1 in the first direction Z, and as a second elastic member 42 in contact with both of the movable body 3 and a portion of the support 2 (the second end plate 29) opposite to the movable body 3 on the other side Z2 in the first direction Z.

The gel damper member has linear or non-linear expansion and contraction characteristics depending on the expansion and contraction direction thereof. For example, when the plate-like gel damper member is pressed in the thickness direction (axial direction) to be compressively deformed, the plate-like gel damper member has an expansion and contraction characteristic in which the non-linear component is larger than the linear component. On the other hand, when the plate-like gel damper member is pulled and stretched in the thickness direction (axial direction), the plate-like gel damper member has an expansion and contraction characteristic in which the linear component is larger than the non-linear component. Also, when the plate-like gel damper member is deformed in a direction (shear direction) intersecting with the thickness direction (axial direction), the plate-like gel damper member has a deformation characteristic in which the linear component is larger than the non-linear component. In the present embodiment, the elastic member 4 (the viscoelastic body) is configured to deform in the shearing direction when the movable body 3 is vibrated in the X direction and the Y direction.

The plurality of magnetic drive circuits (the first magnetic drive circuit 6, the second magnetic drive circuit 7, and the third magnetic drive circuit 8) each has coils and magnets facing the respective coils. The coils are provided on one side member of the support 2 and the movable body 3, and the magnets are provided on other side member of the support 2 and the movable body 3. In the present embodiment, the coils (first coil 61, second coil 71 and third coil 81) and coil holders (first coil holder 65, second coil holder 75 and third coil holder 85) are provided on the support 2, as will be described below. Also, the magnets (first magnets 621 and 622, second magnets 721 and 722 and third magnets 821 and 822), and yokes (first yoke 64, second yoke 74 and third yoke 84) are provided on the movable body 3. The first magnetic drive circuit 6 is arranged to overlap with the second magnetic drive circuit 7 on the one side Z1 in the Z direction, and the third magnetic drive circuit 8 is arranged to overlap with the second magnetic drive circuit 7 on the opposite side to the first magnetic drive circuit 6 with respect to the second magnetic drive circuit 7. Therefore, the first magnetic drive circuit 6, the second magnetic drive circuit 7, and the third magnetic drive circuit 8 are arranged to be sequentially stacked from the one side Z1 to the other side Z2 in the Z direction.

(Configuration of Drive Circuit)

Figure 6:
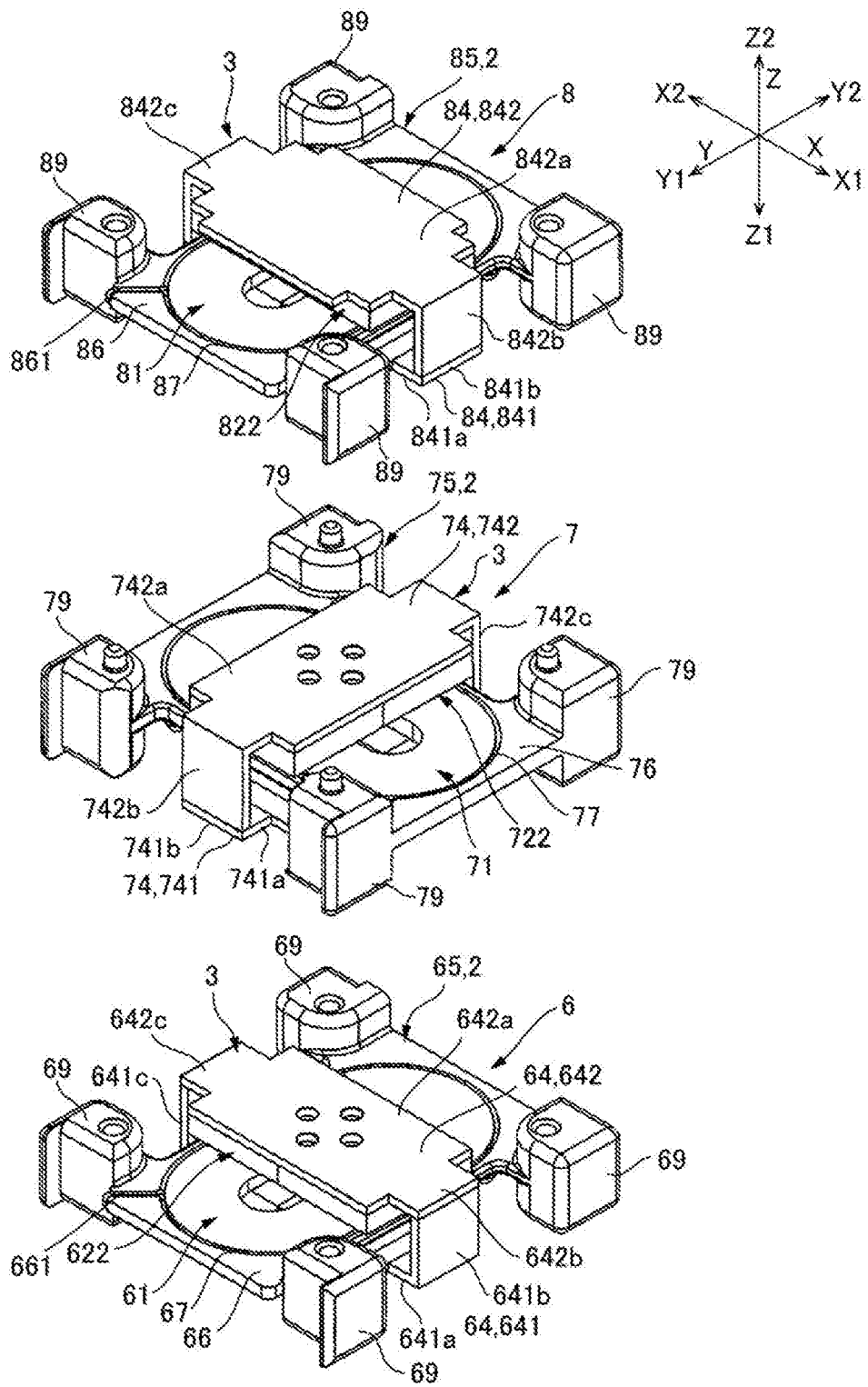
FIG. 6 is an exploded perspective view when a magnetic drive circuit used in the actuator shown in FIG. 1 is disassembled.

FIG. 6 is an exploded perspective view when a magnetic drive circuit used in the actuator shown in FIG. 1 is disassembled. As shown in FIG. 3, FIG. 4, FIG. 5 and FIG. 6, the first magnetic drive circuit 6 includes: the first coil 61, the first magnet 621 opposed to the first coil 61 on the one side Z1 in the Z direction, and the first magnet 622 opposed to the first coil 61 on the other side Z2 in the Z direction. The second magnetic drive circuit 7 includes: the second coil 71, the second magnet 721 opposed to the second coil 71 on the one side Z1 in the Z direction, and the second magnet 722 opposed to the second coil 71 on the other side Z2 in the Z direction. The third magnetic drive circuit 8 includes: the third coil 81, the third magnet 821 opposed to the third coil 81 on the one side Z1 in the Z direction, and the third magnet 822 opposed to the third coil 81 on the other side Z2 in the Z direction.

In order to arrange the first magnetic drive circuit 6, the second magnetic drive circuit 7, and the third magnetic drive circuit 8 configured as described above so as to be stacked on one another in the Z direction, the support 2 includes: the first coil holder 65 for holding the first coil 61, the second coil holder 75 for holding the second coil 71, and the third coil holder 85 for holding the third coil 81. The first coil holder 65, the second coil holder 75 and the third coil holder 85 are arranged to be stacked sequentially from the one side Z1 to the other side Z2 in the Z direction. Further, among the first coil holder 65, the second coil holder 75 and the third coil holder 85, adjacent coil holders in the Z direction are coupled to each other.

Also, the movable body 3 includes a plurality of yokes (first yoke 64, second yoke 74 and third yoke 84) which are placed on the one side Z1 in the Z direction with respect to the first coil 61, between the first coil 61 and the second coil 71, between the second coil 71 and the third coil 81, and on the other side Z2 in the Z direction with respect to the third coil 81. The first magnets 621 and 622, the second magnets 721 and 722, and the third magnets 821 and 822 are each held in any one of the plurality of yokes. Further, among the plurality of yokes, adjacent yokes in the Z direction are coupled to each other.

In the present embodiment, the plurality of yokes includes: the first yoke 64 disposed on both sides in the Z direction with respect to the first coil 61, the second yoke 74 disposed on both sides in the Z direction with respect to the second coil 71, and the third yoke 84 disposed on both sides in the Z direction with respect to the third coil 81. The first yoke 64 holds the first magnets 621 and 622 disposed on both sides in the Z direction with respect to the first coil 61. The second yoke 74 holds the second magnets 721 and 722 disposed on both sides in the Z direction with respect to the second coil 71. The third yoke 84 holds the third magnets 821 and 822 disposed on both sides in the Z direction with respect to the third coil 81.

(Detailed Configuration of First Magnetic Drive Circuit 6)

Figure 7:
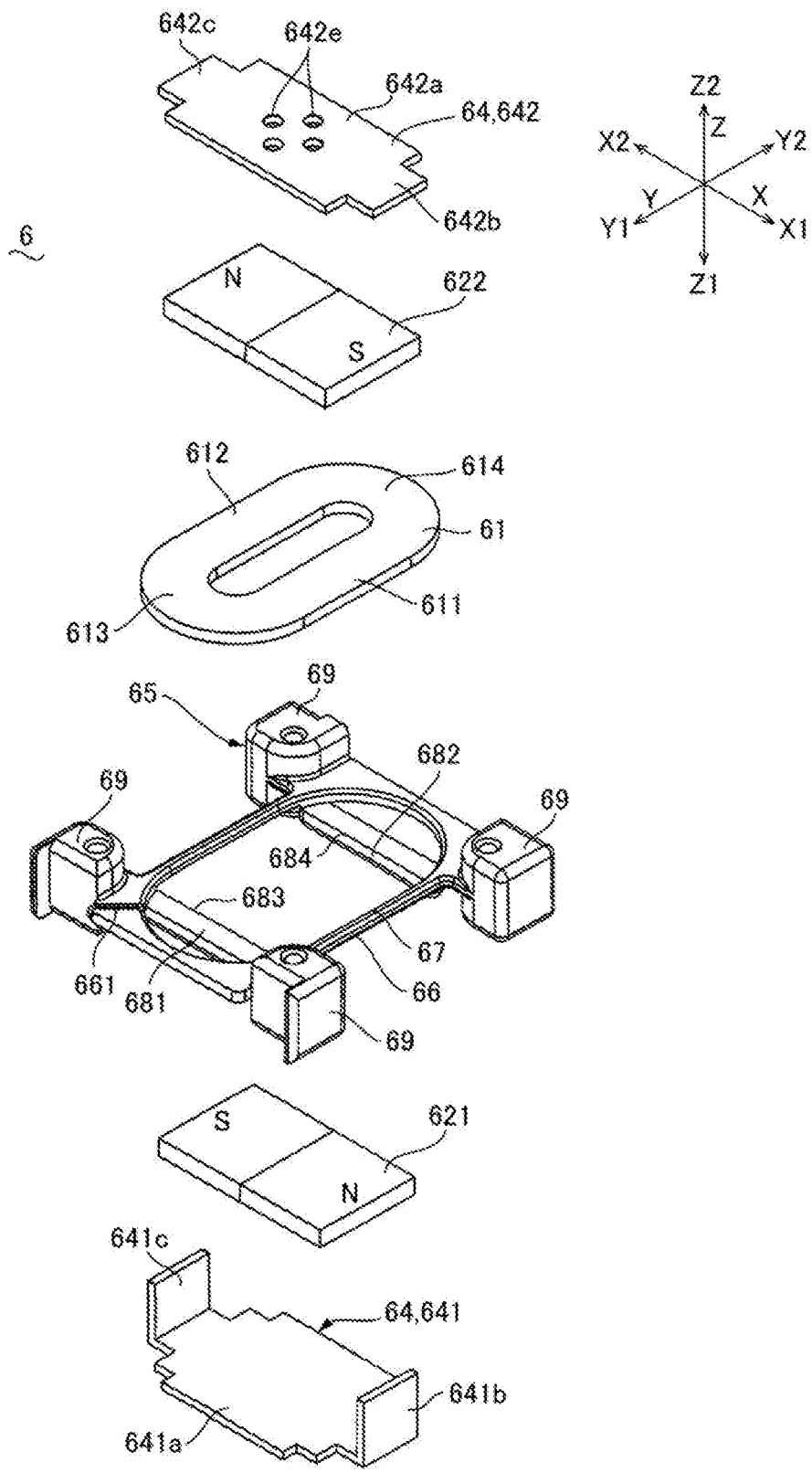
FIG. 7 is an exploded perspective view of a first magnetic drive circuit shown in FIG. 6.

FIG. 7 is an exploded perspective view of the first magnetic drive circuit 6 shown in FIG. 6. As shown in FIG. 5, FIG. 6 and FIG. 7, the first coil holder 65 includes: a first frame portion 66 which holds the first coil 61 on the inside thereof, and a plurality of first columnar portions 69 projecting from ends (four corners) of the first frame portion 66 to both sides in the Z direction. The first columnar portion 69 is coupled to the first end plate 28. The first coil holder 65 is made of resin or metal. In the present embodiment, the first coil holder 65 and the first end plate 28 are made of resin.

The first coil 61 used in the first magnetic drive circuit 6 is an oval air-core coil having first effective side portions 611 and 612 (long side portions) extending in the Y direction. In correspondence to the shape, the first frame portion 66 of the first coil holder 65 includes a first opening 67 which has an oval shape and the major axis direction of which is directed in the Y direction, and the first coil 61 is fixed to the inside of the first opening 67 by adhesion or the like.

In the first coil holder 65, at a position overlapping with both ends in the Y direction of the first opening 67 on the one side Z1 in the Z direction with respect to the first frame portion 66, first seat portions 681 and 682 that support, on the one side Z1 in the Z direction, first invalid side portions 613 and 614 (short side portions) extending in the X direction at both ends of the first coil 61 are provided. The first seat portions 681 and 682 project from the first frame portion 66 to the one side Z1 in the Z direction, and constitute a bottom portion of the one side Z1 in the Z direction at both ends in the Y direction of the first opening 67. A groove 661 extends from the first opening 67 toward the other side X2 in the X direction and the one side Y1 in the Y direction on the surface of the first frame portion 66 on the other side Z2 in the Z direction, and the groove 661 is a guide groove for passing the lead-out portion of the winding start of the first coil 61. The thickness (dimension in the Z direction) of the first frame portion 66 is larger than the thickness (dimension in the Z direction) of the first coil 61. Therefore, in a state where the first coil 61 is accommodated inside the first opening 67, the first coil 61 does not project from the first frame portion 66 to the other side Z2 in the Z direction.

Each of the first magnets 621 and 622 has a rectangular planar shape, and has long sides extending in the X direction and short sides extending in the Y direction. The first magnets 621 and 622 are each magnetized in the X direction, and the N poles and the S poles are respectively opposed to the first effective side portions 611 and 612 of the first coil 61. Therefore, when the first coil 61 is energized, the first magnetic drive circuit 6 generates a driving force for driving the movable body 3 in the X direction. In the first magnetic drive circuit 6, the first yoke 64 includes a yoke plate 641 disposed on the one side Z1 in the Z direction with respect to the first coil 61, and a yoke plate 642 disposed on the other side Z2 in the Z direction with respect to the first coil 61. The yoke plate 641 includes a magnet holding portion 641a having a flat shape and holding the first magnet 621 with the surface thereof on the other side Z2 in the Z direction, and side plate portions 641b and 641c which are bent toward the other side Z2 in the Z direction from both ends of the magnet holding portion 641a in the X direction. The yoke plate 642 includes a magnet holding portion 642a having a flat shape and holding the first magnet 622 with the surface thereof on the one side Z1 in the Z direction, and coupling plate portions 642b and 642c projecting from both ends of the magnet holding portion 642a in the X direction to one side X1 and the other side X2 in the X direction. In the present embodiment, the end of the side plate portion 641b of the yoke plate 641 and the end of the coupling plate portion 642b of the yoke plate 642 are coupled by welding, crimping, or the like, and the end of the side plate portion 641c of the yoke plate 641 and the end of the coupling plate portion 642c of the yoke plate 642 are coupled by welding, crimping, or the like.

(Detailed Configuration of Second Magnetic Drive Circuit 7)

Figure 8:
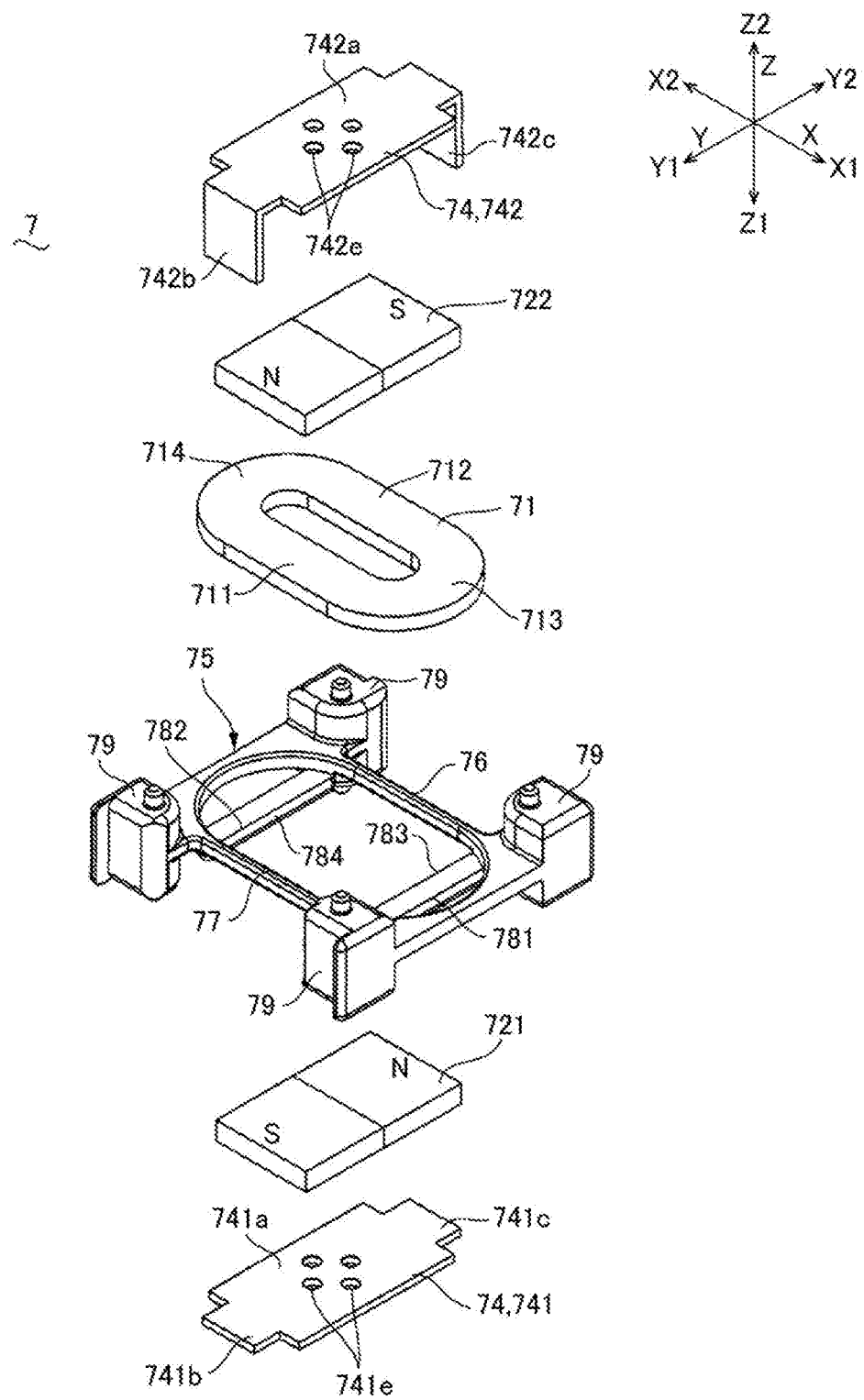
FIG. 8 is an exploded perspective view of a second magnetic drive circuit shown in FIG. 6.

FIG. 8 is an exploded perspective view of the second magnetic drive circuit 7 shown in FIG. 6. As shown in FIG. 5, FIG. 6 and FIG. 8, the second coil holder 75 includes: a second frame portion 76 which holds the second coil 71 on the inside thereof, and a plurality of second columnar portions 79 projecting from ends (four corners) of the second frame portion 76 to both sides in the Z direction, and the second columnar portions 79 are coupled to the first columnar portion 69 of the first coil holder 65 adjacent on the one side Z1 in the Z direction. The second coil holder 75 is made of resin or metal. In the present embodiment, the second coil holder 75 is made of resin.

The second coil 71 used in the second magnetic drive circuit 7 is an oval air-core coil having second effective side portions 711 and 712 (long side portions) extending in the X direction. In corresponding to the shape, the second frame portion 76 of the second coil holder 75 includes a second opening 77 which has an oval shape and the major axis direction of which is directed in the X direction and the second coil 71 is fixed to the inside of the second opening 77 by adhesion or the like.

In the second coil holder 75, at a position overlapping with both ends of the second opening 77 in the X direction on the one side Z1 in the Z direction with respect to the second frame portion 76, second seat portions 781 and 782 that support, on the one side Z1 in the Z direction, second invalid side portions 713 and 714 (short side portions) extending in the Y direction at both ends of the second coil 71 are provided. The second seat portions 781 and 782 project from the second frame portion 76 to the one side Z1 in the Z direction, and constitute a bottom portion of the one side Z1 in the Z direction at both ends of the first opening 77 in the X direction. A groove (not shown) extends from the second opening 77 toward the one side X1 in the X direction and the one side Y1 in the Y direction on the surface of the second frame portion 76 on the other side Z2 in the Z direction, and the groove is a guide groove for passing the lead-out portion of the winding start of the second coil 71. The thickness (dimension in the Z direction) of the second frame portion 76 is larger than the thickness (dimension in the Z direction) of the second coil 71. Therefore, in a state where the second coil 71 is accommodated inside the second opening 77, the second coil 71 does not project from the second frame portion 76 to the other side Z2 in the Z direction.

Each of the second magnets 721 and 722 has a rectangular planar shape, and has long sides extending in the Y direction and short sides extending in the X direction. The second magnets 721 and 722 are each polarized in the Y direction, and the N poles and the S poles are respectively opposed to the second effective side portions 711 and 712 of the second coil 71. Therefore, when the second coil 71 is energized, the second magnetic drive circuit 7 generates a driving force for driving the movable body 3 in the Y direction. In the second magnetic drive circuit 7, the second yoke 74 includes a yoke plate 741 disposed on the one side Z1 in the Z direction with respect to the second coil 71, and a yoke plate 742 disposed on the other side Z2 in the Z direction with respect to the second coil 71. The yoke plate 742 includes a magnet holding portion 742a having a flat shape and holding the second magnet 722 with the surface thereof on the one side Z1 in the Z direction, and side plate portions 742b and 742c which are bent toward the one side Z1 in the Z direction from both ends of the magnet holding portion 742a in the Y direction. The yoke plate 741 includes a magnet holding portion 741a having a flat shape and holding the second magnet 721 with the surface thereof on the other side Z2 in the Z direction, and coupling plate portions 741b and 741c projecting from both ends of the magnet holding portion 741a in the Y direction to the one side Y1 and the other side Y2 in the Y direction. In the present embodiment, the end of the side plate portion 742b of the yoke plate 742 and the end of the coupling plate portion 741b of the yoke plate 741 are coupled by welding, crimping, or the like, and the end of the side plate portion 742c of the yoke plate 742 and the end of the coupling plate portion 741c of the yoke plate 741 are coupled by welding, crimping, or the like.

The yoke plate 741 and the yoke plate 642 have holes 741e and 642e, respectively, and the yoke plate 741 and the yoke plate 642 are coupled by welding, crimping or the like inside the holes 741e and 642e after being positioned with reference to the holes 741e and 642e.

(Detailed Configuration of Third Magnetic Drive Circuit 8)

Figure 9:
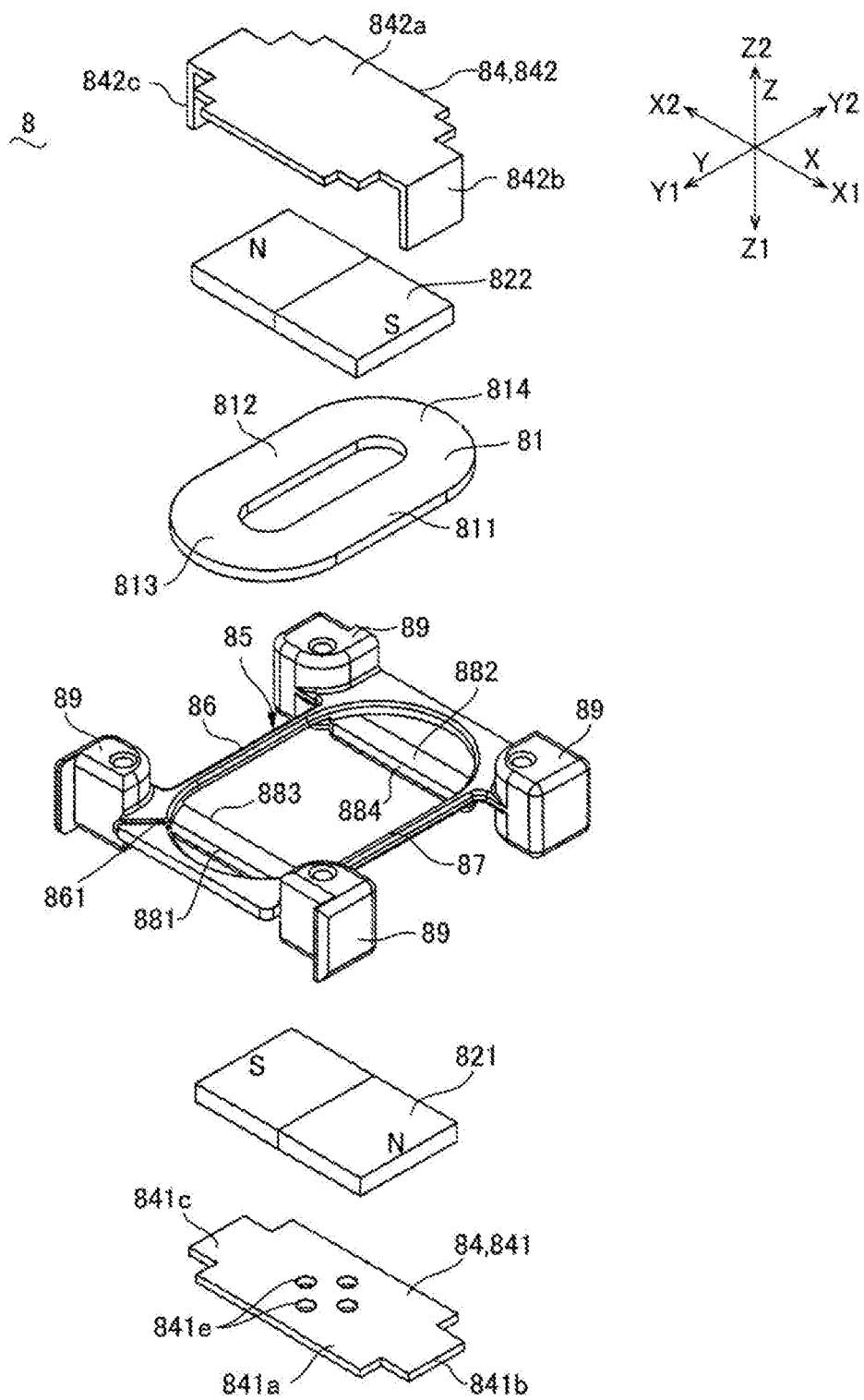
FIG. 9 is an exploded perspective view of a third magnetic drive circuit shown in FIG. 6.

FIG. 9 is an exploded perspective view of the third magnetic drive circuit 8 shown in FIG. 6. As shown in FIG. 5, FIG. 6 and FIG. 9, the third coil holder 85 includes: a third frame portion 86 which holds the third coil 81 on the inside thereof and a plurality of third columnar portions 89 projecting from ends (four corners) of the third frame portion 86 to both sides in the Z direction, and the third columnar portion 89 is coupled to the second columnar portion 79 of the second coil holder 75 adjacent on the one side Z1 in the Z direction. In addition, the third columnar portion 89 is coupled to the second end plate 29. The third coil holder 85 is made of resin or metal. In the present embodiment, the third coil holder 85 and the second end plate 29 are made of resin.

The third magnetic drive circuit 8 is configured similarly to the first magnetic drive circuit 6. More specifically, the third coil 81 used in the third magnetic drive circuit 8 is an oval air-core coil having third effective side portions 811 and 812 (long side portions) extending in the Y direction. In corresponding to the shape, the third frame portion 86 of the third coil holder 85 includes a third opening 87 which has an oval shape and the major axis direction of which is directed in the Y direction, and the third coil 81 is fixed to the inside of the third opening 87 by adhesion or the like.

In the third coil holder 85, at a position overlapping with both ends of the third opening 87 in the Y direction on the one side Z1 in the Z direction with respect to the third frame portion 86, third seat portions 881 and 882 that support, on the one side Z1 of the Z direction, third invalid side portions 813 and 814 (short side portions) extending in the X direction at both ends of the third coil 81 are provided. The third seat portions 881 and 882 project from the third frame portion 86 to the one side Z1 in the Z direction, and constitute a bottom portion of the one side Z1 in the Z direction at both ends of the third opening 87 in the Y direction. A groove 861 extends from the third opening 87 toward the other side X2 in the X direction and the one side Y1 in the Y direction on the surface of the third frame portion 86 on the other side Z2 in the Z direction, and the groove 861 is a guide groove for passing the lead-out portion of the winding start and the lead-out portion of the winding end of the third coil 81. The thickness (dimension in the Z direction) of the third frame portion 86 is larger than the thickness (dimension in the Z direction) of the third coil 81. Therefore, in a state where the third coil 81 is accommodated inside the third opening 87, the third coil 81 does not project from the third frame portion 86 to the other side Z2 in the Z direction.

Each of the third magnets 821 and 822 has a rectangular planar shape, and has long sides extending in the X direction and short sides extending in the Y direction. The third magnets 821 and 822 are each magnetized in the X direction, and the N poles and the S poles are opposed to the third effective side portions 811 and 812 of the third coil 81, respectively. Therefore, when the third coil 81 is energized, the third magnetic drive circuit 8 generates a driving force for driving the movable body 3 in the X direction in the same manner as the first magnetic drive circuit 6. In the present embodiment, the third magnet 821 is magnetized in the same direction as the first magnet 621 of the first magnetic drive circuit 6, and the third magnet 822 is magnetized in the same direction as the first magnet 622 of the first magnetic drive circuit 6.

In the third magnetic drive circuit 8, the third yoke 84 includes a yoke plate 841 disposed on the one side Z1 in the Z direction with respect to the third coil 81, and a yoke plate 842 disposed on the other side Z2 in the Z direction with respect to the third coil 81. The yoke plate 842 includes a magnet holding portion 842a having a flat shape and holding the third magnet 821 with the surface thereof on the one side Z1 in the Z direction, and side plate portions 842b and 842c which are bent toward the one side Z1 in the Z direction from both ends of the magnet holding portion 842a in the X direction. The yoke plate 841 includes a magnet holding portion 841a having a flat shape and holding the third magnet 822 with the surface thereof on the one side Z1 in the Z direction, and coupling plate portions 841b and 841c projecting from both ends of the magnet holding portion 841a in the X direction to the one side X1 and the other side X2 in the X direction. In the present embodiment, the end of the side plate portion 842b of the yoke plate 842 and the end of the coupling plate portion 841b of the yoke plate 841 are coupled by welding, crimping, or the like, and the end of the side plate portion 842c of the yoke plate 842 and the end of the coupling plate portion 841c of the yoke plate 841 are coupled by welding, crimping, or the like.

The yoke plate 841 and the yoke plate 742 have holes 841e and 742e, respectively, and the yoke plate 841 and the yoke plate 742 are coupled by welding, crimping or the like inside the holes 841e and 742e after being positioned with reference to the holes 841e and 742e.

(Positional Relationship Between Magnetic Center of Magnetic Drive Circuit and Center of Gravity of Movable Body 3)

In the actuator 1 configured as described above, the first coil 61, the second coil 71, the third coil 81, the first coil holder 65, the second coil holder 75, and the third coil holder 85 are configured to be symmetrical with respect to a virtual line extending in the Y direction through the center of the movable body 3 in the X direction, and with respect to a virtual line extending in the X direction through the center of the movable body 3 in the Y direction. Also, the first magnets 621 and 622, the second magnets 721 and 722, the third magnets 821 and 822, the first yoke 64, the second yoke 74, and the third yoke 84 are configured to be symmetrical with respect to a virtual line extending in the Y direction through the center of the movable body 3 in the X direction, and with respect to a virtual line extending in the X direction through the center of the movable body 3 in the Y direction. Further, the second coil 71 is located at the center of the movable body 3 in the Z direction, and the second magnets 721 and 722 are disposed plane-symmetrically about the second coil 71 in the Z direction. Moreover, the first magnets 621 and 622 and the first yoke 64 are arranged plane-symmetrically about the second coil 71 in the Z direction with respect to the third magnets 821 and 822 and the third yoke 84.

Therefore, the magnetic center position (drive center) of the second magnetic drive circuit 7 coincides with or substantially coincides with the position of the center of gravity of the movable body 3 in the Z, X, and Y directions. Also, the magnetic center position obtained by combining the magnetic center position of the first magnetic drive circuit 6 and the magnetic center position of the third magnetic drive circuit 8 coincides with or substantially coincides with the position of the center of gravity of the movable body 3 in the Z, X and Y directions.

(Basic Operation)

In the actuator 1 of the present embodiment, when the power supply to the second coil 71 is stopped while an alternating current (AC) is applied to the first coil 61 and the third coil 81, the movable body 3 vibrates in the X direction, and the center of gravity in the actuator 1 fluctuates in the X direction. Therefore, the user can feel the vibration in the X direction. At this time, if the AC waveforms applied to the first coil 61 and the third coil 81 are adjusted such that the acceleration at which the movable body 3 moves to the one side X1 in the X direction is different from the acceleration at which the movable body 3 moves to the other side X2 in the second direction, the user can feel vibration having directivity in the X direction.

Further, the power supply to the first coil 61 and the third coil 81 is stopped while AC is applied to the second coil 71. As a result, the movable body 3 vibrates in the Y direction, and the center of gravity in the actuator 1 fluctuates in the Y direction. Therefore, the user can feel the vibration in the Y direction. At this time, the AC waveform applied to the second coil 71 is adjusted such that the acceleration at which the movable body 3 moves to the one side Y1 in the Y direction is different from the acceleration at which the movable body 3 moves to the other side Y2 in the third direction. As a result, the user can feel vibration having directivity in the Y direction.

Further, by combining the energization of the first coil 61 and the third coil 81 and the energization of the second coil 71, the user can obtain a sensation in which the vibration in the X direction and the vibration in the Y direction are combined. Further, when alternating currents having opposite phases are applied to the first coil 61 and the third coil 81, couple of forces around a center axis extending in the Z direction is applied to the movable body 3, so that the user can obtain a more complicated feeling.

(Stopper Mechanism)

The actuator 1 of the present embodiment has a stopper mechanism shown in FIG. 3 and FIG. 4 such that, when the movable body 3 moves excessively with respect to the support 2, a weak portion of one of the support 2 and the movable body 3 is prevented from coming into contact with the other. More specifically, as shown in FIG. 4, the first seat portion 681 of the first coil holder 65 is located at a position facing the first magnet 621 with a predetermined distance on the one side Y1 in the Y direction, and the first seat portion 682 of the first coil holder 65 is located at a position facing the first magnet 621 with a predetermined distance on the other side Y2 in the Y direction. Further, the third seat portion 881 of the third coil holder 85 is located at a position facing the third magnet 821 with a predetermined distance on the one side Y1 in the Y direction, and the third seat portion 882 of the third coil holder 85 is located at a position facing the third magnet 821 with a predetermined distance on the other side Y2 in the Y direction. In the present embodiment, the side end portions of the first seat portions 681 and 682 opposite to the first magnet 621 in the Y direction function as first stopper portions 683 and 684. Further, the side end portions of the third seat portions 881 and 882 opposite to the third magnet 821 in the Y direction function as third stopper portions 883 and 884. Therefore, the movable range of the movable body 3 in the Y direction when the movable body 3 is driven in the Y direction by the second magnetic drive circuit 7 is regulated by a stopper mechanism constituted by the first magnet 621 of the first magnetic drive circuit 6 and the first seat portions 681 and 682 (the first stoppers 683 and 684) of the first coil holder 65, and a stopper mechanism constituted by the third magnet 821 of the third magnetic drive circuit 8 and the third seat portions 881 and 882 (the third stoppers 883 and 884) of the third coil holder 85.

In the present embodiment, the first stopper portions 683 and 684 are positioned closer to the side of the first magnets 621 than the inner edges of the first invalid side portions 613 and 614 of the first coil 61. Therefore, even if, for example, the lead-out portion on the winding start side of the first coil 61 passes between the first coil 61 and the first seat portion 681 from the inner edge of the first invalid side portion 613, it is unlikely that the first magnet 621 will come into contact with the lead-out portion on the winding start side of the first coil 61. Therefore, it is unlikely that the lead-out portion on the winding start side of the first coil 61 will be disconnected. The third stopper portions 883 and 884 are located closer to the side of the third magnet 821 than the inner edges of the third invalid side portions 813 and 814 of the third coil 81. Therefore, even if, for example, the lead-out portion on the winding start side of the third coil 81 passes between the third coil 81 and the third seat portion 881 from the inner edge of the third invalid side portion 813, it is unlikely that the third magnet 821 will come into contact with the lead-out portion on the winding start side of the third coil 81. Therefore, it is unlikely that the lead-out portion on the winding start side of the third coil 81 will be disconnected.

Further, as shown in FIG. 3, the second seat portion 781 of the second coil holder 75 is located at a position opposite to the second magnet 721 of the second magnetic drive circuit 7 with a predetermined distance on the one side X1 in the X direction, and the second seat portion 782 of the second coil holder 75 is located at a position opposite to the second magnet 721 with a predetermined distance on the other side X2 in the X direction. In the present embodiment, the side end portions of the second seat portions 781 and the second seat portion 782 opposite to the second magnet 721 in the X direction functions as the second stopper portions 783 and 784. Therefore, the movable range when the movable body 3 is driven in the X direction by the first magnetic drive circuit 6 and the third magnetic drive circuit 8 is regulated by a stopper mechanism constituted by the second magnet 721 of the second magnetic drive circuit 7 and the second seat portions 781 and 782 (the second stoppers 783 and 784) of the second coil holder 75.

In the present embodiment, the second stopper portions 783 and 784 are positioned closer to the side of the second magnets 721 than the inner edges of the second invalid side portions 713 and 714 of the second coil 71. Therefore, even if, for example, the lead-out portion on the winding start side of the second coil 71 passes between the second coil 71 and the second seat portion 781 from the inner edge of the second invalid side portion 713, it is unlikely that the second magnet 721 will come into contact with the lead-out portion on the winding start side of the second coil 71. Therefore, it is unlikely that the lead-out portion on the winding start side of the second coil 71 will be disconnected.

(Main Effect of the Present Embodiment)

As described above, the actuator 1 according to the present embodiment has the first magnetic drive circuit 6 for vibrating the movable body 3 in the X direction, the second magnetic drive circuit 7 for vibrating the movable body 3 in the Y direction, and the third magnetic drive circuit 8 for vibrating the movable body 3 in the X direction, and thus the movable body 3 can be vibrated in the X direction and the Y direction. Therefore, the user can feel vibration in the X direction, vibration in the Y direction, and vibration in which the vibration in the X direction and the vibration in the Y direction are combined. Moreover, since the first magnetic drive circuit 6, the second magnetic drive circuit 7, and the third magnetic drive circuit 8 are arranged to be stacked in the Z direction, the size (planar area) of the actuator 1 when viewed from the Z direction is small. Therefore, the actuator 1 according to the present embodiment is suitable for mounting on a device such as a controller or the like held in hand. Further, the first magnetic drive circuit 6 and the third magnetic drive circuit 8 for vibrating the movable body 3 in the X direction are provided on both sides in the Z direction of the second magnetic drive circuit 7 for vibrating the movable body 3 in the Y direction. Therefore, when the movable body 3 is vibrated in the X direction, a situation such as tilting of the movable body 3 hardly occurs.

Further, the movable range of the movable body 3 in the X direction and the Y direction with respect to the support 2 is regulated by a stopper mechanism configured between the first coil holder 65 and the first magnet 621, a stopper mechanism configured between the second coil holder 75 and the second magnet 721, and a stopper mechanism configured between the third coil holder 85 and the third magnet 821. Such stopper mechanisms can be provided at positions overlapping with the first magnetic drive circuit 6, the second magnetic drive circuit 7 and the third magnetic drive circuit 8 in the Z direction. Therefore, it is possible to reduce the planar area of the actuator 1 when viewed from the Z direction.

Further, the first magnet 621 and the third magnet 821 used for the first magnetic drive circuit 6 and the third magnetic drive circuit 8 which drive the movable body 3 in the X direction have dimensions in the Y direction shorter than dimensions in the X direction. Thus, the stopper mechanism to regulate the movable range of the movable body 3 in the Y direction is configured by utilizing the space on both sides of the first magnet 621 and the third magnet 821 in the Y direction. Also, the second magnet 721 used in the second magnetic drive circuit 7 for driving the movable body 3 in the Y direction has a dimension in the X direction shorter than that in the Y direction. Thus, the stopper mechanism to regulate the movable range of the movable body 3 in the X direction is configured by utilizing the space on both sides of the second magnet 721 in the X direction. Therefore, it is easy to provide the stopper mechanisms at positions overlapping with the first magnetic drive circuit 6, the second magnetic drive circuit 7, and the third magnetic drive circuit 8 in the Z direction.

Further, the first stopper portions 683 and 684 are configured by using the first seat portions 681 and 682 of the first coil holder 65 supporting the first coil 61, the second stopper portions 783 and 774 are configured by using the second seat portions 781 and 782 of the second coil holder 75 supporting the second coil 71, and the third stopper portions 883 and 874 are configured using the third seat portions 881 and 882 of the third coil holder 85 supporting the third coil 81. Therefore, it is not necessary to provide a convex portion (stopper portion) separate from the first seat portions 681 and 682, the second stopper portions 783 and 774, and the third seat portions 881 and 882 in the first coil holder 65, the second coil holder 75, and the third coil holder 85. Therefore, the configuration of the first coil holder 65, the second coil holder 75, and the third coil holder 85 can be simplified.

Also, the magnetic center position (drive point) of the second magnetic drive circuit 7 coincides with or substantially coincides with the position of the center of gravity of the movable body 3 in the Z, X and Y directions. Also, the magnetic center position obtained by combining the magnetic center position (drive point) of the first magnetic drive circuit 6 and the magnetic center position (drive point) of the third magnetic drive circuit 8 coincides or substantially coincides with the position of the center of gravity of the movable body 3 in the Z, X, and Y directions. Therefore, when the movable body 3 is vibrated in the X direction and the Y direction, a situation such as tilting of the movable body 3 hardly occurs.

Further, with respect to the support 2, the first coil holder 65, the second coil holder 75, and the third coil holder 85 are arranged to be sequentially stacked from the one side Z1 to the other side Z2 in the Z direction, and the coil holders adjacent in the Z direction are coupled to each other. Therefore, the first coil holder 65, the second coil holder 75, and the third coil holder 85 can be used for the support 2 as an integral coil holder. At this time, since the first columnar portion 69 of the first coil holder 65, the second columnar portion 79 of the second coil holder 75, and the third columnar portion 89 of the third coil holder 85 are coupled to each other, the first coil holder 65, the second coil holder 75, and the third coil holder 85 can be integrated with each other in a state where a space for disposing the magnet and the yoke is secured between each of the first coil 61, the second coil 71, and the third coil 81.

Also, with respect to the movable body 3, since yokes adjacent in the Z direction among the plurality of yokes (the first yoke 64, the second yoke 74, and the third yoke 84) are coupled to each other, the plurality of yokes (the first yoke 64, the second yoke 74, and the third yoke 84) can be used for the movable body 3 as an integral yoke.

Also, the elastic member 4 is the viscoelastic member having viscoelasticity, and is provided on the one side Z1 in the Z direction with respect to the movable body 3 and on the other side Z2 in the Z direction with respect to the movable body 3. Therefore, when the movable body 3 vibrates in the X direction and the Y direction with respect to the support 2, the elastic member 4 deforms in the shearing direction orthogonal to the expansion and contraction direction. Therefore, since the elastic member 4 deforms in a range in which linearity is high, it is possible to obtain a vibration characteristic with good linearity.

That is, the elastic member 4 (the first elastic member 41 and the second elastic member 42) is the viscoelastic member (plate-like gel damper member), and has linear or non-linear expansion and contraction characteristics depending on the expansion and contraction direction. For example, when the elastic member 4 is pressed in the thickness direction (axial direction) to be compressed and deformed, the elastic member 4 has an expansion and contraction characteristic in which the non-linear component (spring coefficient) is larger than the linear component (spring coefficient). On the other hand, when the elastic member 4 is pulled and extended in the thickness direction (axial direction), the elastic member 4 has an expansion and contraction characteristic in which the linear component (spring coefficient) is larger than the non-linear component (spring coefficient). Further, when the elastic member 4 is deformed in a direction (shearing direction) intersecting the thickness direction (axial direction), the deformation is a deformation in a direction in which the elastic member 4 is pulled and extended whichever direction the elastic member 4 moves. Therefore, the elastic member 4 has a deformation characteristic in which the linear component (spring coefficient) is larger than the non-linear component (spring coefficient). In the present embodiment, the elastic member 4 (viscoelastic member) is configured to deform in the shearing direction when the movable body 3 vibrates in the X direction and the Y direction. Therefore, when the movable body 3 vibrates in the X direction and the Y direction, the spring force in the movement direction becomes constant in the elastic member 4. Therefore, by using the spring element of the elastic member 4 in the shearing direction to improve the reproducibility of the vibration acceleration for the input signal, it is possible to realize the vibration with delicate nuances.

Further, the elastic member 4 is attached so as to expand and contract in the first direction Z between the movable body 3 and the support 2. Furthermore, when the elastic member 4 is pressed in the thickness direction (axial direction) between the movable body 3 and the support 2 to be compressed and deformed, the elastic member 4 has an expansion and contraction characteristic in which the non-linear component (spring coefficient) is larger than the linear component (spring coefficient). Therefore, it is possible to suppress large deformation of the elastic member 4 in the Z direction orthogonal to the driving direction of the movable body 3. Therefore, a large change in the gap between the movable body 3 and the support 2 can be suppressed.

Also, both surfaces of the first elastic member 41 in the Z direction are respectively connected to the movable body 3 and the first end plate 28 by a method such as adhesion, and both surfaces of the second elastic member 42 in the Z direction are respectively connected to the movable body 3 and the second end plate 29 by a method such as adhesion. Therefore, since the elastic member 4 reliably follows the movement of the movable body 3, it is possible to effectively prevent the resonance of the movable body 3.

Further, the movable range when the movable body 3 is driven in the X direction by the first magnetic drive circuit 6 and the third magnetic drive circuit 8 is regulated by the stopper mechanism constituted by the second magnet 721 of the second magnetic drive circuit 7 and the second seat portion 781 and 782 of the second coil holder 75. Also, the movable range of the movable body 3 in the Y direction when the movable body 3 is driven in the Y direction by the second magnetic drive circuit 7 is regulated by the stopper mechanism constituted by the first magnet 621 of the first magnetic drive circuit 6 and the first seat portions 681 and 682 of the first coil holder 65, and by the stopper mechanism constituted by the third magnet 821 of the third magnetic drive circuit 8 and the third seat portions 881 and 882 of the third coil holder 85. Therefore, even when the movable body 3 is excessively moved, the portions where the strength is weak are hard to contact each other, so that the reliability of the actuator 1 is high.

SECOND EMBODIMENT

An actuator 1 according to a second embodiment of the present invention will be described with reference to FIG. 10 to FIG. 17. It should be noted that since the basic configuration of the present embodiment is the same as that of the first embodiment, the corresponding portions are described with the same reference numerals.

(Overall Configuration)

Figure 10:
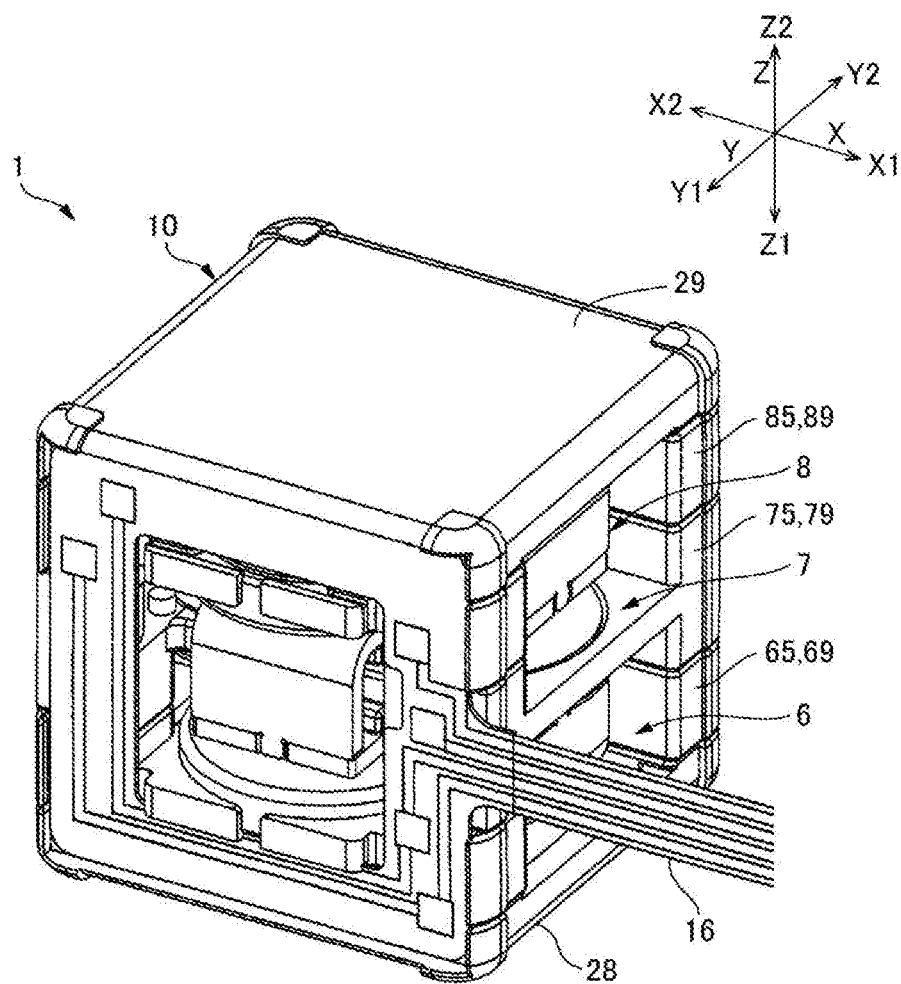
FIG. 10 is a perspective view of an actuator according to a second embodiment of the present invention.
Figure 11:
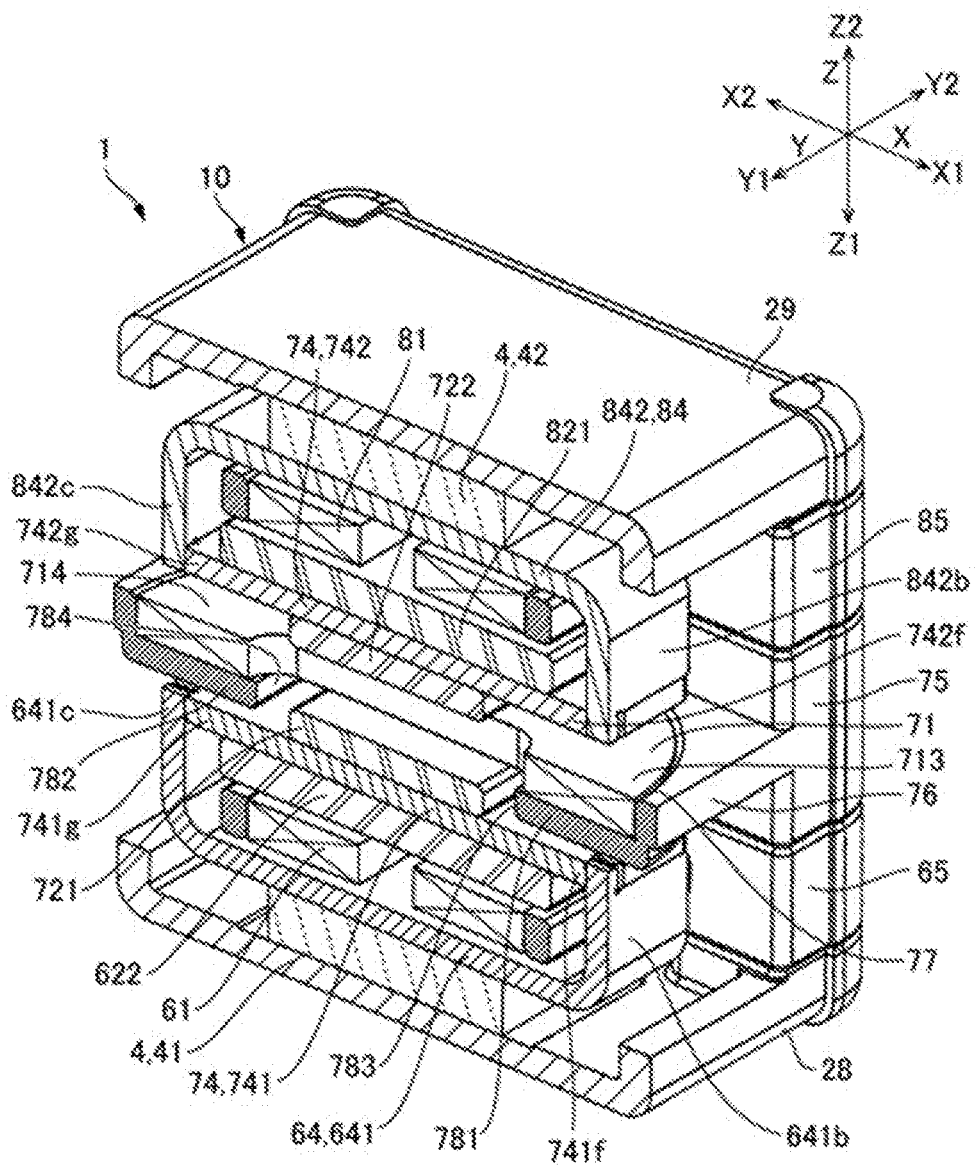
FIG. 11 is an explanatory view when the actuator shown in FIG. 10 is cut in the first direction and the second direction.
Figure 12:
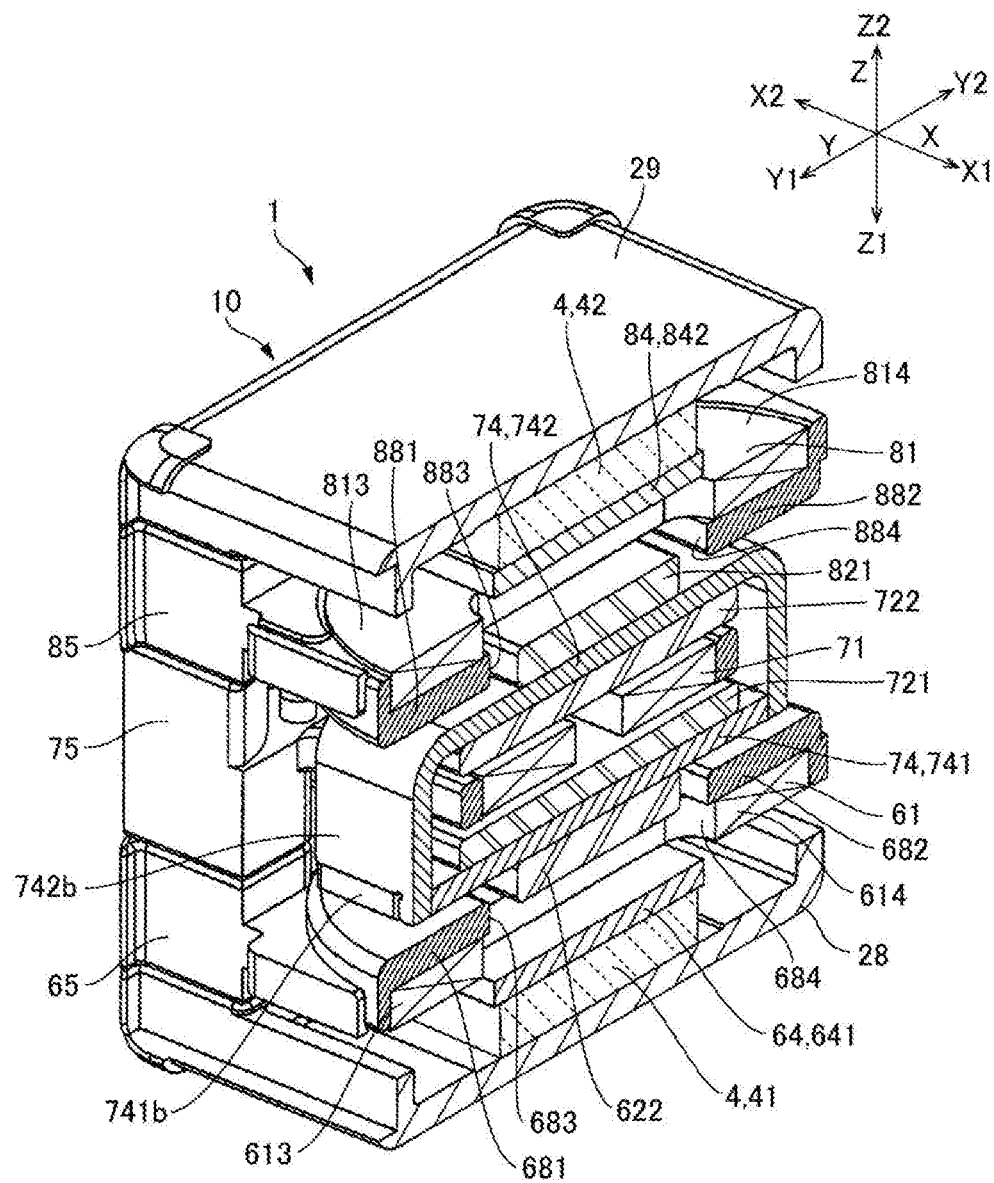
FIG. 12 is an explanatory view when the actuator shown in FIG. 10 is cut in the first direction and the third direction.
Figure 13:
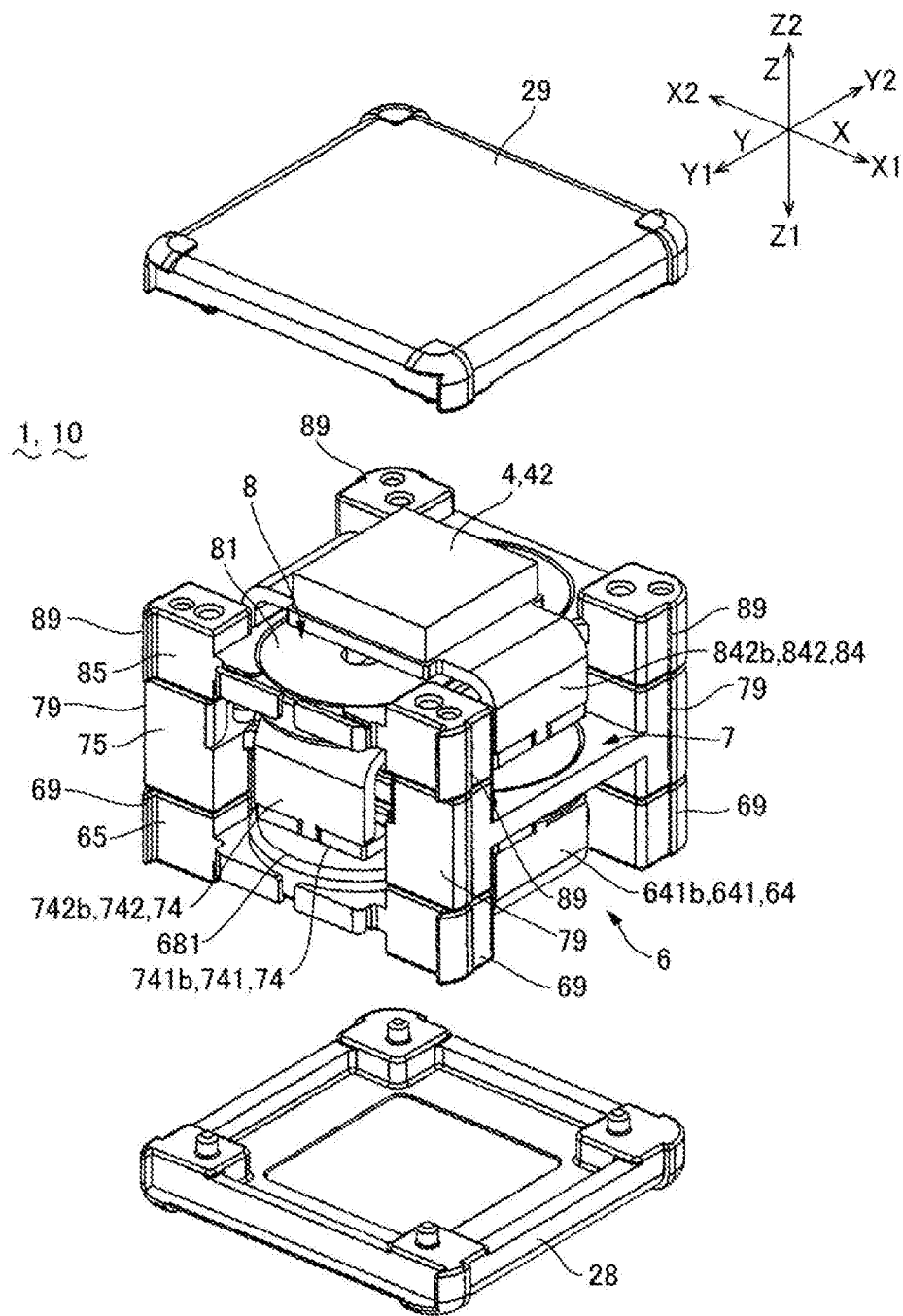
FIG. 13 is an exploded perspective view of the actuator in a state in which a first end plate and a second end plate shown in FIG. 10 are removed.

FIG. 10 is a perspective view of the actuator 1 according to the second embodiment of the present invention. FIG. 11 is an explanatory view when the actuator 1 shown in FIG. 10 is cut in the Z direction and the X direction. FIG. 12 is an explanatory view when the actuator 1 shown in FIG. 10 is cut in the Z direction and the Y direction. FIG. 13 is an exploded perspective view of the actuator in a state in which a first end plate 28 and a second end plate 29 shown in FIG. 10 are removed.

As shown in FIG. 10, the actuator 1 of the present embodiment has: a body portion 10 having a rectangular parallelepiped shape, and a wiring board 16 made of a flexible wiring board is attached to the surface of the body portion 10 on the one side Y1 in the Y direction. A plurality of electrodes 161 and a wiring pattern 162 are formed on the wiring board 16, and an end of a coil described later is connected to the electrodes 161.

As shown in FIG. 11, FIG. 12 and FIG. 13, the actuator 1 has: a support 2, a movable body 3, and an elastic member 4 disposed between the support 2 and the movable body 3. The movable body 3 is supported by the support 2 movably in the Z direction, the X direction, and the Y direction through the elastic member 4. Also, the actuator 1 has a plurality of magnetic drive circuits (first magnetic drive circuit 6, second magnetic drive circuit 7 and third magnetic drive circuit 8) for vibrating the movable body 3 with respect to the support 2 in X and Y directions.

The support 2 has a first end plate 28 at an end on one side Z1 in the Z direction and a second end plate 29 at an end on the other side Z2 in the Z direction. The first end plate 28 is opposed to the movable body 3 on the one side Z1 in the Z direction, and a first elastic member 41 (the elastic member 4) is disposed between the movable body 3 and the first end plate 28. The second end plate 29 is opposed to the movable body 3 on the other side Z2 in the Z direction, and a second elastic member 42 (the elastic member 4) is disposed between the movable body 3 and the second end plate 29.

In the present embodiment, the elastic member 4 is a viscoelastic body having viscoelasticity, and in the present embodiment, a plate-like gel damper member is used as the elastic member 4 (the viscoelastic body). Both surfaces of the first elastic member 41 in the Z direction are respectively connected to the movable body 3 and the first end plate 28 by a method such as adhesion. Both surfaces of the second elastic member 42 in the Z direction are respectively connected to the movable body 3 and the second end plate 29 by a method such as adhesion.

The gel damper member has linear or non-linear expansion and contraction characteristics depending on the expansion and contraction direction thereof. For example, when the plate-like gel damper member is pressed in the thickness direction (axial direction) to be compressively deformed, the plate-like gel damper member has an expansion and contraction characteristic in which the non-linear component is larger than the linear component. On the other hand, when the plate-like gel damper member is pulled and stretched in the thickness direction (axial direction), the plate-like gel damper member has an expansion and contraction characteristic in which the linear component is larger than the non-linear component. Also, when the plate-like gel damper member is deformed in a direction (shear direction) intersecting with the thickness direction (axial direction), the plate-like gel damper member has a deformation characteristic in which the linear component is larger than the non-linear component. In the present embodiment, when the movable body 3 is vibrated in the X direction and the Y direction, the elastic member 4 (the viscoelastic body) is configured to deform in the shearing direction.

The plurality of magnetic drive circuits (the first magnetic drive circuit 6, the second magnetic drive circuit 7, and the third magnetic drive circuit 8) each has coils and magnets opposite each of the coils. The coils are provided on one side member of the support 2 and the movable body 3, and the magnets are provided on other side member of the support 2 and the movable body 3. In the present embodiment, the coils (first coil 61, second coil 71 and third coil 81) and coil holders (first coil holder 65, second coil holder 75 and third coil holder 85) are provided on the support 2, as will be described below. Also, the magnets (the first magnet 622, the second magnets 721 and 722 and the third magnet 821), and yokes (first yoke 64, second yoke 74 and third yoke 84) are provided on the movable body 3. Further, the first magnetic drive circuit 6, the second magnetic drive circuit 7, and the third magnetic drive circuit 8 are arranged to be sequentially stacked from the one side Z1 to the other side Z2 in the Z direction.

(Configuration of Drive Circuit)

Figure 14:
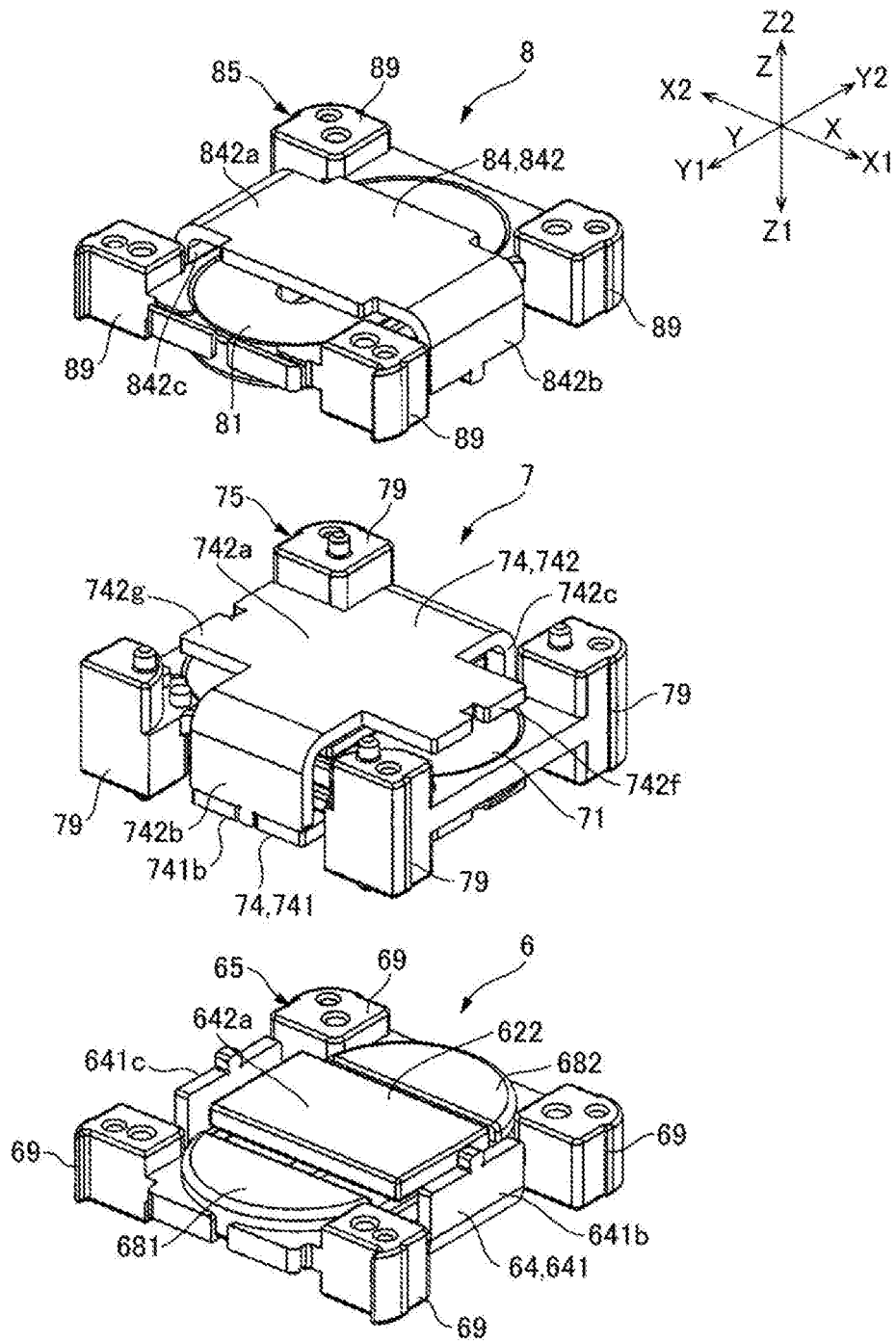
FIG. 14 is an exploded perspective view when a magnetic drive circuit used for the actuator shown in FIG. 10 is disassembled.

FIG. 14 is an exploded perspective view when a magnetic drive circuit used in the actuator 1 shown in FIG. 10 is disassembled. As shown in FIG. 11, FIG. 12, FIG. 13 and FIG. 14, the first magnetic drive circuit 6 includes the first coil 61, and the first magnet 622 opposed to the first coil 61 on the other side Z2 in the Z direction. The second magnetic drive circuit 7 includes: the second coil 71, the second magnet 721 opposed to the second coil 71 on the one side Z1 in the Z direction, and the second magnet 722 opposed to the second coil 71 on the other side Z2 in the Z direction. The third magnetic drive circuit 8 includes the third coil 81, and the third magnet 821 opposed to the third coil 81 on the one side Z1 in the Z direction.

In order to arrange the first magnetic drive circuit 6, the second magnetic drive circuit 7, and the third magnetic drive circuit 8 configured as described above so as to be stacked on one another in the Z direction, the support 2 includes: a first coil holder 65 for holding the first coil 61, and a second coil holder 75 for holding the second coil 71, and a third coil holder 85 for holding the third coil 81. The first coil holder 65, the second coil holder 75 and the third coil holder 85 are arranged to be stacked sequentially from the one side Z1 to the other side Z2 in the Z direction. Further, among the first coil holder 65, the second coil holder 75 and the third coil holder 85, adjacent coil holders in the Z direction are coupled to each other.

Also, the movable body 3 includes a plurality of yokes (first yoke 64, second yoke 74 and third yoke 84) which are placed on the one side Z1 in the Z direction with respect to the first coil 61, between the first coil 61 and the second coil 71, between the second coil 71 and the third coil 81, and on the other side Z2 in the Z direction with respect to the third coil 81. The first magnet 622, the second magnets 721 and 722, and the third magnet 821 are each held in any one of the plurality of yokes. Further, among the plurality of yokes, adjacent yokes in the Z direction are coupled to each other.

In the present embodiment, the plurality of yokes includes: the first yoke 64 (yoke plate 641) disposed on the one side Z1 in the Z direction with respect to the first coil 61, the second yoke 74 (yoke plates 741 and 742) disposed on both sides in the Z direction with respect to the second coil 71, and the third yoke 84 disposed on the other side Z2 in the Z direction with respect to the third coil 81. Here, the second yoke 74 holds the second magnets 721 and 722 disposed on both sides in the Z direction with respect to the second coil 71. Further, the second yoke 74 holds the first magnet 622 facing the first coil 61 on the other side Z2 in the Z direction, and the third magnet 821 facing the third coil 81 on the one side Z1 in the Z direction. Therefore, the first yoke 64 and the third yoke 84 do not hold the magnets.

(Detailed Configuration of First Magnetic Drive Circuit 6)

Figure 15:
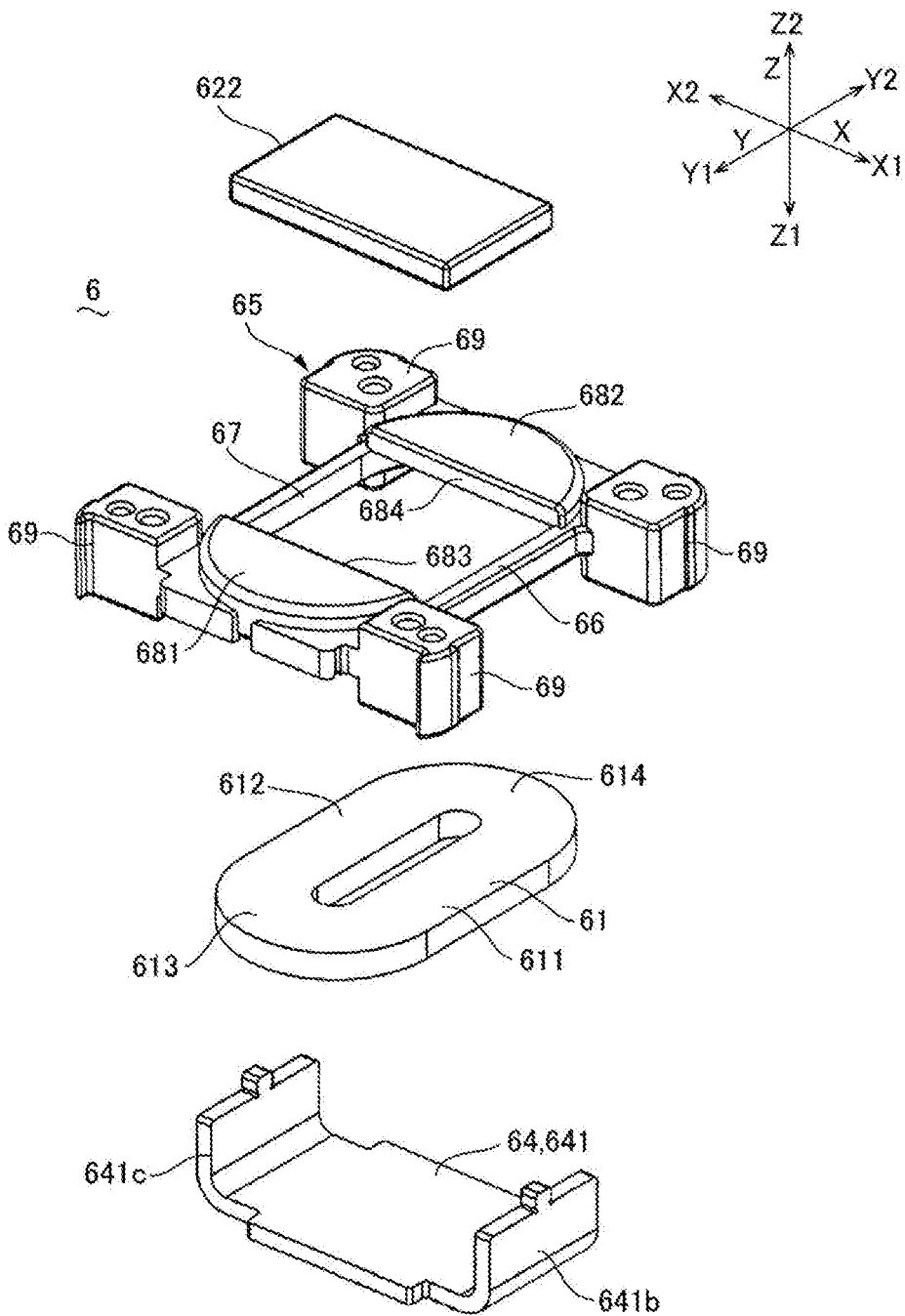
FIG. 15 is an exploded perspective view of a first magnetic drive circuit shown in FIG. 14.

FIG. 15 is an exploded perspective view of the first magnetic drive circuit 6 shown in FIG. 14. As shown in FIG. 13, FIG. 14 and FIG. 15, the first coil holder 65 includes: a first frame portion 66 which holds the first coil 61 on the inside thereof, and a plurality of first columnar portions 69 projecting from ends (four corners) of the first frame portion 66 to both sides in the Z direction. The first columnar portion 69 is coupled to the first end plate 28. The first coil holder 65 is made of a resin or a metal. In the present embodiment, the first coil holder 65 and the first end plate 28 are made of resin.

The first coil 61 used in the first magnetic drive circuit 6 is an oval air-core coil having first effective side portions 611 and 612 (long side portions) extending in the Y direction. In correspondence to the shape, the first frame portion 66 of the first coil holder 65 includes a first opening 67 which has an oval shape and the major axis direction of which is directed in the Y direction, and the first coil 61 is fixed to the inside of the first opening 67 by adhesion or the like.

In the first coil holder 65, at a position overlapping with both ends of the first opening 67 in the Y direction on the other side Z2 in the Z direction with respect to the first frame portion 66, first seat portions 681 and 682 that support, on the other side Z2 in the Z direction, first invalid side portions 613 and 614 (short side portions) extending in the X direction at both ends of the first coil 61 are provided. The first seat portions 681 and 682 project from the first frame portion 66 to the other side Z2 in the Z direction, and constitutes a bottom portion of the other side Z2 in the Z direction at both ends of the first opening 67 in the X direction. Note that a recess (not shown) extends from the first opening 67 to the edge on the surface of the first frame portion 66 on the one side Z1 in the Z direction, and is a guide portion for passing the lead-out portion of the winding start of the first coil 61. The thickness (dimension in the Z direction) of the first frame portion 66 is larger than the thickness (dimension in the Z direction) of the first coil 61. Therefore, in a state where the first coil 61 is accommodated inside the first opening 67, the first coil 61 does not project from the first frame portion 66 to the one side Z1 in the Z direction.

The first magnet 622 has a rectangular planar shape, long sides extending in the X direction, and short sides extending in the Y direction. The first magnet 622 is polarized in the X direction, and the N pole and the S pole are respectively opposed to the first effective side portions 611 and 612 of the first coil 61. Therefore, when the first coil 61 is energized, the first magnetic drive circuit 6 generates a driving force for driving the movable body 3 in the X direction. In the first magnetic drive circuit 6, the first yoke 64 includes a yoke plate 641 disposed on the one side Z1 in the Z direction with respect to the first coil 61. The yoke plate 641 has side plate portions 641b and 641c bent from both ends in the X direction toward the other side Z2 in the Z direction, and a concave portion is formed at the tip of the side plate portions 641b and 641c.

(Detailed Configuration of Second Magnetic Drive Circuit 7)

Figure 16:
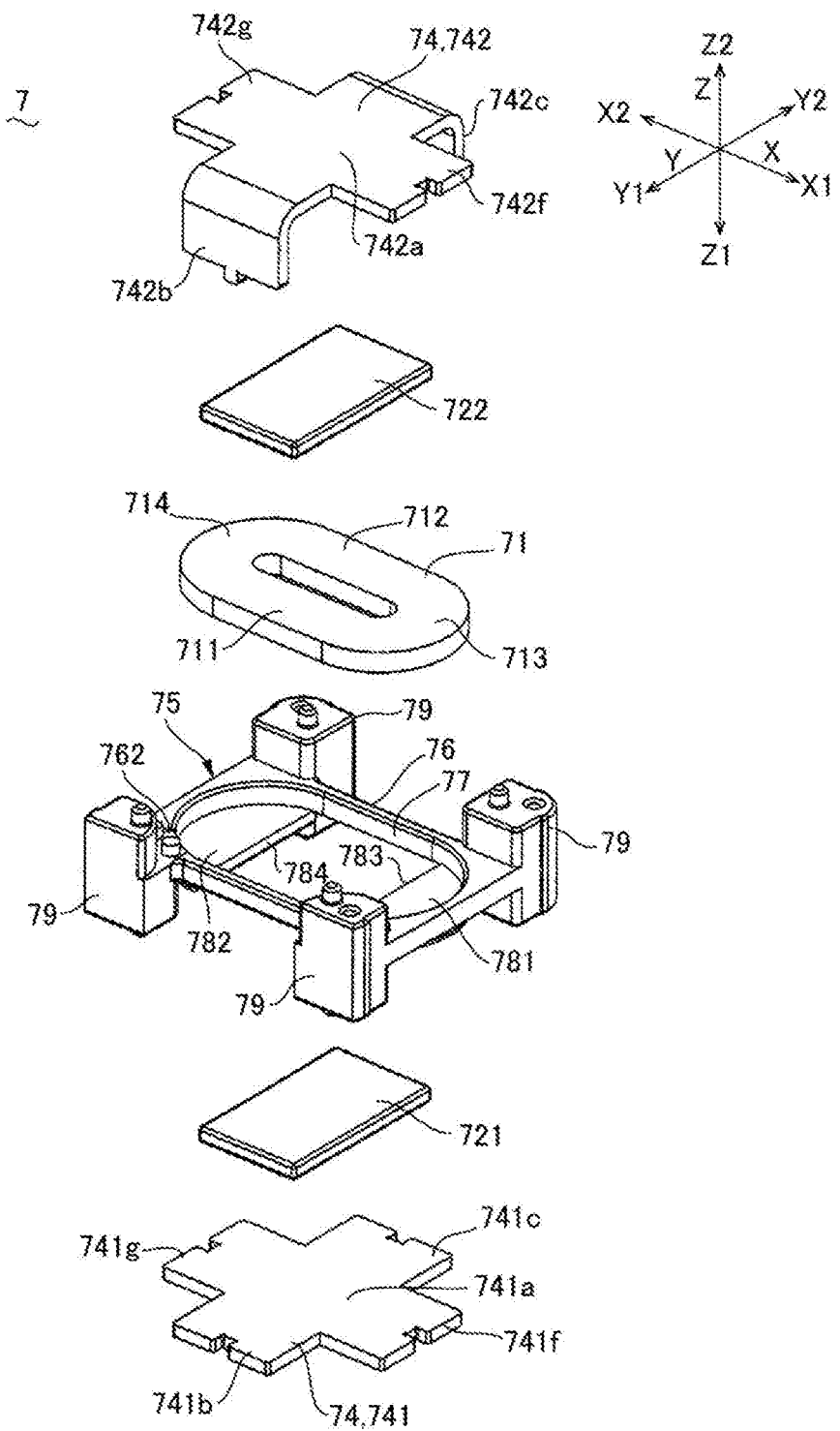
FIG. 16 is an exploded perspective view of a second magnetic drive circuit shown in FIG. 14.

FIG. 16 is an exploded perspective view of the second magnetic drive circuit 7 shown in FIG. 14. As shown in FIG. 13, FIG. 14 and FIG. 16, the second coil holder 75 includes: a second frame portion 76 for holding the second coil 71 inside, and a plurality of second columnar portions 79 projecting from ends (four corners) of the second frame portion 76 to both sides in the Z direction, and the second columnar portions 79 are coupled to the first columnar portion 69 of the first coil holder 65 adjacent on the one side Z1 in the Z direction. The second coil holder 75 is made of resin or metallic material. In the present embodiment, the second coil holder 75 is made of a resin material.

The second coil 71 used in the second magnetic drive circuit 7 is an oval air-core coil having second effective side portions 711 and 712 (long side portions) extending in the X direction. In corresponding to the shape, the second frame portion 76 of the second coil holder 75 includes a second opening 77 which has an oval shape and the major axis direction of which is directed in the X direction and the second coil 71 is fixed to the inside of the second opening 77 by adhesion or the like.

In the second coil holder 75, at a position overlapping both ends of the second opening 77 in the X direction on the one side Z1 in the Z direction with respect to the second frame portion 76, second seat portions 781 and 782 that support, on the one side Z1 in the Z direction, second invalid side portions 713 and 714 (short side portions) extending in the Y direction at both ends of the second coil 71 are provided. The second seat portions 781 and 782 project from the second frame portion 76 to the one side Z1 in the Z direction, and constitutes a bottom of the one side Z1 in the Z direction at both ends of the second opening 77 in the X direction. A recess 762 extends from the second opening 77 toward the edge of the second frame portion 76, and the recess 762 is a guide portion for passing the lead-out portion of the winding start of the second coil 71. The thickness (dimension in the Z direction) of the second frame portion 76 is larger than the thickness (dimension in the Z direction) of the second coil 71. Therefore, in a state where the second coil 71 is accommodated inside the second opening 77, the second coil 71 does not project from the second frame portion 76 to the other side Z2 in the Z direction.

Each of the second magnets 721 and 722 has a rectangular planar shape, long sides extending in the Y direction, and short sides extending in the X direction. The second magnets 721 and 722 are each polarized in the Y direction, and the N poles and the S poles are respectively opposed to the second effective side portions 711 and 712 of the second coil 71. Therefore, when the second coil 71 is energized, the second magnetic drive circuit 7 generates a driving force for driving the movable body 3 in the Y direction. In the second magnetic drive circuit 7, the second yoke 74 includes a yoke plate 741 disposed on the one side Z1 in the Z direction with respect to the second coil 71, and a yoke plate 742 disposed on the other side Z2 in the Z direction with respect to the second coil 71. The yoke plate 742 includes a magnet holding portion 742*a* having a flat shape and holding the second magnet 722 with the surface thereof on the one side Z1 in the Z direction, side plate portions 742*b* and 742*c* which are bent toward the one side Z1 in the Z direction from both ends of the magnet holding portion 742*a* in the Y direction, and coupling plate portions 742*f* and 742*g* which project from both ends of the magnet holding portion 742*a* in the X direction to both sides in the X direction. Convex portions are formed at the tip portions of the side plate portions 742*b* and 742*c*, and notches are formed at the tip portions of the coupling plate portions 742*f* and 742*g*. In the present embodiment, the third magnet 821 of the third magnetic drive circuit 8 is held on the surface of the magnet holding portion 742*a* of the yoke plate 742 on the other side Z2 in the Z direction.

The yoke plate 741 includes a magnet holding portion 741*a* having a flat plate shape for holding the second magnet 721 on the other side Z2 in the Z direction, coupling plate portions 741*b* and 741*c* projecting from both ends of the magnet holding portion 741*a* in the Y direction to the one side Y1 and the other side Y2 in the Y direction, and coupling plate portions 741*f* and 741*g* projecting from both ends of the magnet holding portion 741*a* in the X direction to the one side Y1 and the other side Y2 in the X direction. Notches are formed in tip portions of the coupling plate portions 741*b*, 741*c*, 741*f* and 741*g*. In the present embodiment, the third magnet 821 of the third magnetic drive circuit 8 is held on the surface of the magnet holding portion 742*a* of the yoke plate 742 on the other side Z2 in the Z direction.

In the present embodiment, the tip portion of the side plate portion 742*b* and the tip portion of the coupling plate portion 741*b* are coupled by welding, crimping, or the like, in a state where the convex portion formed at the tip portion of the side plate portion 742*b* of the yoke plate 742 is fitted in the notch formed at the tip portion of the coupling plate portion 741*b* of the yoke plate 741. Also, the tip portion of the side plate portion 742*c* and the tip portion of the coupling plate portion 741*c* are coupled by welding, crimping, or the like, in a state where the convex portion formed at the tip portion of the side plate portion 742*c* of the yoke plate 742 is fitted in the notch formed at the tip portion of the coupling plate portion 741*c* of the yoke plate 741.

Further, the tip portion of the side plate portion 641*b* and the tip portion of the coupling plate portion 741*f* are coupled by welding, crimping, or the like, in a state where the convex portion formed on the tip portion of the side plate portion 641*b* of the yoke plate 641 shown in FIG. 15 is fitted in the notch formed on the tip portion of the coupling plate portion 741*f* of the yoke plate 741. Also, the tip portion of the side plate portion 641*c* and the tip portion of the coupling plate portion 741*g* are coupled by welding, crimping, or the like, in a state where the convex portion formed on the tip portion of the side plate portion 641*c* of the yoke plate 641 shown in FIG. 15 is fitted in the notch formed on the tip portion of the coupling plate portion 741*g* of the yoke plate 741.

(Detailed Configuration of Third Magnetic Drive Circuit 8)

Figure 17:
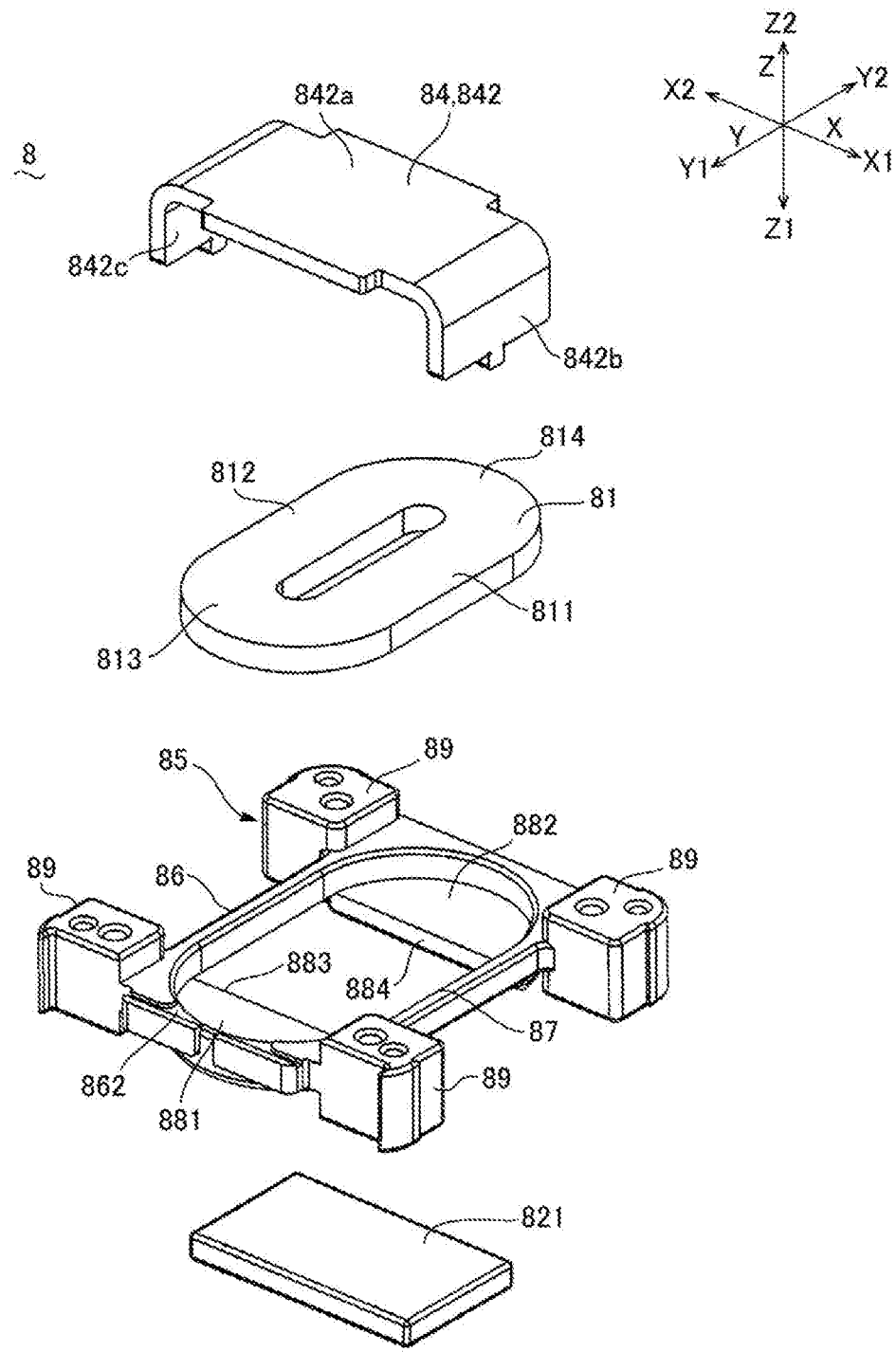
FIG. 17 is an exploded perspective view of a third magnetic drive circuit shown in FIG. 14.

FIG. 17 is an exploded perspective view of the third magnetic drive circuit 8 shown in FIG. 14. As shown in FIG. 13, FIG. 14 and FIG. 17, the third coil holder 85 includes: a third frame portion 86 that holds the third coil 81 inside and a plurality of third columnar portions 89 projecting from ends (four corners) of the third frame portion 86 to both sides in the Z direction, and the third columnar portion 89 is coupled to the second columnar portion 79 of the second coil holder 75 adjacent on the one side Z1 in the Z direction. In addition, the third columnar portion 89 is coupled to the second end plate 29. The third coil holder 85 is made of a resin or a metal. In the present embodiment, the third coil holder 85 and the second end plate 29 are made of resin.

The third magnetic drive circuit 8 is configured similarly to the first magnetic drive circuit 6. More specifically, the third coil 81 used in the third magnetic drive circuit 8 is an oval air-core coil having third effective side portions (long side portions) extending in the Y direction. In corresponding to the shape, the third frame portion 86 of the third coil holder 85 includes a third opening 87 which has an oval shape and the major axis direction of which is directed in the Y direction, and the third coil 81 is fixed to the inside of the third opening 87 by adhesion or the like.

In the third coil holder 85, at a position overlapping with both ends of the third opening 87 in the Y direction on the one side Z1 in the Z direction with respect to the third frame portion 86, third seat portions 881 and 882 that support, on the one side Z1 in the Z direction, third invalid side portions 813 and 814 (short side portions) extending in the X direction at both ends of the third coil 81 are provided. The third seat portions 881 and 882 project from the third frame portion 86 to the one side Z1 in the Z direction, and constitute the bottom of the one side Z1 in the Z direction at both ends of the third opening 87 in the Y direction. A recess 862 extends from the third opening 87 toward the edge of the third frame portion 86, and the recess 862 is a guide portion for passing the lead-out portion of the winding start of the third coil 81. The thickness (dimension in the Z direction) of the third frame portion 86 is larger than the thickness (dimension in the Z direction) of the third coil 81. The thickness (dimension in the Z direction) of the third frame portion 86 is larger than the thickness (dimension in the Z direction) of the third coil 81. Therefore, in a state where the third coil 81 is accommodated inside the third opening 87, the third coil 81 does not project from the third frame portion 86 to the other side Z2 in the Z direction.

The third magnet 821 has a rectangular planar shape, long sides extending in the X direction, and short sides extending in the Y direction. The third magnet 821 is magnetized in the X direction, and the N pole and the S pole are opposed to the third effective side portions 811 and 812 of the third coil 81, respectively. Therefore, when the third coil 81 is energized, the third magnetic drive circuit 8 generates a driving force for driving the movable body 3 in the X direction in the same manner as the first magnetic drive circuit 6. In the present embodiment, the third magnet 821 is magnetized in the same direction as the first magnet 622 of the first magnetic drive circuit 6.

In the third magnetic drive circuit 8, the third yoke 84 includes a yoke plate 842 disposed on the other side Z2 in the Z direction with respect to the third coil 81. The yoke plate 842 has side plate portions 842b and 842c bent from both ends in the X direction toward the one side Z1 in the Z direction, and convex portions are formed at the tip portions of the side plate portions 842b and 842c. In the present embodiment, the tip portion of the side plate portion 842b and the tip portion of the coupling plate portion 742f are coupled by welding, crimping, or the like, in a state where the convex portion formed on the tip portion of the side plate portion 842b of the yoke plate 842 is fitted in the notch formed on the tip portion of the coupling plate portion 742f of the yoke plate 742. Also, the tip portion of the side plate portion 842c and the tip portion of the coupling plate portion 742g are coupled by welding, crimping, or the like, in a state where the convex portion formed on the tip portion of the side plate portion 842c of the yoke plate 842 is fitted in the notch formed on the tip portion of the coupling plate portion 742g of the yoke plate 742.

(Positional Relationship Between Magnetic Center of Magnetic Drive Circuit and Center of Gravity of Movable Body 3)

In the actuator 1 configured as described above, the first coil 61, the second coil 71, the third coil 81, the first coil holder 65, the second coil holder 75, and the third coil holder 85 are configured to be symmetrical with respect to a virtual line extending in the Y direction through the center of the movable body 3 in the X direction, and with respect to a virtual line extending in the X direction through the center of the movable body 3 in the Y direction. Also, the first magnet 622, the second magnets 721 and 722, the third magnet 821, the first yoke 64, the second yoke 74, and the third yoke 84 are configured to be symmetrical with respect to a virtual line extending in the Y direction through the center of the movable body 3 in the X direction, and with respect to a virtual line extending in the X direction through the center of the movable body 3 in the Y direction. Further, the second coil 71 is located at the center of the movable body 3 in the Z direction, and the second magnets 721 and 722 are disposed plane-symmetrically about the second coil 71 in the Z direction. Moreover, the first magnet 622 and the first yoke 64 are arranged plane-symmetrically about the second coil 71 in the Z direction with respect to the third magnet 821 and the third yoke 84.

Therefore, the magnetic center position (drive center) of the second magnetic drive circuit 7 coincides with or substantially coincides with the position of the center of gravity of the movable body 3 in the Z, X, and Y directions. Also, the magnetic center position obtained by combining the magnetic center position of the first magnetic drive circuit 6 and the magnetic center position of the third magnetic drive circuit 8 coincides with or substantially coincides with the position of the center of gravity of the movable body 3 in the Z, X and Y directions.

(Basic Operation)

In the actuator 1 of the present embodiment, when the power supply to the second coil 71 is stopped while an alternating current (AC) is applied to the first coil 61 and the third coil 81, the movable body 3 vibrates in the X direction, and the center of gravity in the actuator 1 fluctuates in the X direction. Therefore, the user can feel the vibration in the X direction. At this time, if the AC waveforms applied to the first coil 61 and the third coil 81 are adjusted such that the acceleration at which the movable body 3 moves to the one side X1 in the X direction is different from the acceleration at which the movable body 3 moves to the other side X2 in the second direction, the user can feel vibration having directivity in the X direction.

Further, the power supply to the first coil 61 and the third coil 81 is stopped while AC is applied to the second coil 71. As a result, the movable body 3 vibrates in the Y direction, and the center of gravity in the actuator 1 fluctuates in the Y direction. Therefore, the user can feel the vibration in the Y direction. At this time, the AC waveform applied to the second coil 71 is adjusted such that the acceleration at which the movable body 3 moves to the one side Y1 in the Y direction is different from the acceleration at which the movable body 3 moves to the other side Y2 in the third direction. As a result, the user can feel vibration having directivity in the Y direction.

Further, by combining the energization of the first coil 61 and the third coil 81 and the energization of the second coil 71, the user can obtain a sensation in which the vibration in the X direction and the vibration in the Y direction are combined. Further, when alternating currents having opposite phases are applied to the first coil 61 and the third coil 81, couple of forces around a center axis extending in the Z direction is applied to the movable body 3, so that the user can obtain a more complicated feeling.

(Stopper Mechanism)

The actuator 1 of the present embodiment has a stopper mechanism shown in FIG. 11 and FIG. 12 such that, when the movable body 3 moves excessively with respect to the support 2, a weak portion of one of the support 2 and the movable body 3 is prevented from coming into contact with the other. More specifically, as shown in FIG. 12, the first seat portion 681 of the first coil holder 65 is located at a position facing the first magnet 622 with a predetermined distance on the one side Y1 in the Y direction, and the first seat portion 682 of the first coil holder 65 is located at a position facing the first magnet 622 with a predetermined distance on the other side Y2 in the Y direction. Further, the third seat portion 881 of the third coil holder 85 is located at a position facing the third magnet 821 with a predetermined distance on the one side Y1 in the Y direction, and the third seat portion 882 of the third coil holder 85 is located at a position facing the third magnet 821 with a predetermined distance on the other side Y2 in the Y direction. In the present embodiment, the side end portions of the first seat portions 681 and 682 opposite to the first magnet 622 in the Y direction function as first stopper portions 683 and 684.

Further, the side end portions of the third seat portions 881 and 882 opposite to the third magnet 821 in the Y direction function as third stopper portions 883 and 884. Therefore, the movable range of the movable body 3 in the Y direction when the movable body 3 is driven in the Y direction by the second magnetic drive circuit 7 is regulated by a stopper mechanism constituted by the first magnet 622 of the first magnetic drive circuit 6 and the first seat portions 681 and 682 (the first stopper portions 683 and 684) of the first coil holder 65, and a stopper mechanism constituted by the third magnet 821 of the third magnetic drive circuit 8 and the third seat portions 881 and 882 (the third stopper portions 883 and 884) of the third coil holder 85.

In the present embodiment, the first stopper portions 683 and 684 are positioned closer to the side of the first magnet 621 than the inner edges of the first invalid side portions 613 and 614 of the first coil 61. Therefore, even if, for example, the lead-out portion on the winding start side of the first coil 61 passes between the first coil 61 and the first seat portion 681 from the inner edge of the first invalid side portion 613, it is unlikely that the first magnet 622 will come into contact with the lead-out portion on the winding start side of the first coil 61. Accordingly, it is unlikely that the lead-out portion on the winding start side of the first coil 61 will be disconnected. Also, the third stopper portions 883 and 884 are located closer to the side of the third magnet 821 than the inner edges of the third invalid side portions 813 and 814 of the third coil 81. Therefore, even if, for example, the lead-out portion on the winding start side of the third coil 81 passes between the third coil 81 and the third seat portion 881 from the inner edge of the third invalid side portion 813, it is unlikely that the third magnet 821 will come into contact with the lead-out portion on the winding start side of the third coil 81. Accordingly, it is unlikely that the lead-out portion on the winding start side of the third coil 81 will be disconnected.

Further, as shown in FIG. 11, the second seat portion 781 of the second coil holder 75 is located at a position opposite to the second magnet 721 of the second magnetic drive circuit 7 with a predetermined distance on the one side X1 in the X direction, and the second seat portion 782 of the second coil holder 75 is located at a position opposite to the second magnet 721 at a predetermined distance on the other side X2 in the X direction. In the present embodiment, the side end portions of the second seat portions 781 and the second seat portion 782 opposite to the second magnet 721 in the X direction functions as second stopper portions 783 and 784. Therefore, the movable range when the movable body 3 is driven in the X direction by the first magnetic drive circuit 6 and the third magnetic drive circuit 8 is regulated by a stopper mechanism constituted by the second magnet 721 of the second magnetic drive circuit 7 and the second seat portions 781 and 782 (the second stopper portions 783 and 784) of the second coil holder 75.

In the present embodiment, the second stopper portions 783 and 784 are positioned closer to the side of the second magnets 721 than the inner edges of the second invalid side portions 713 and 714 of the second coil 71. Therefore, even when, for example, the lead-out portion on the winding start side of the second coil 71 passes between the second coil 71 and the second seat portion 781 from the inner edge of the second invalid side portion 713, it is unlikely that the second magnet 721 will come into contact with the lead-out portion on the winding start side of the second coil 71. Therefore, it is unlikely that the lead-out portion on the winding start side of the second coil 71 will be disconnected.

(Main Effect of the Present Embodiments)

As described above, in the actuator 1 of the present embodiment, as in the first embodiment, since the first magnetic drive circuit 6, the second magnetic drive circuit 7, and the third magnetic drive circuit 8 are arranged to be stacked in the Z direction, the size (planar area) of the actuator 1 when viewed from the Z direction is small. Therefore, the actuator 1 according to the present embodiment is suitable for mounting on a device such as a controller or the like held in hand. Further, the first magnetic drive circuit 6 and the third magnetic drive circuit 8 for vibrating the movable body 3 in the X direction are provided on both sides in the Z direction of the second magnetic drive circuit 7 for vibrating the movable body 3 in the Y direction. Therefore, when the movable body 3 is vibrated in the X direction, the same effects as in the first embodiment can be obtained, such as a situation in which the movable body 3 is inclined or the like being less likely to occur.

Further, in the present embodiment, in the second magnetic drive circuit 7, the first magnet 622 of the second magnetic drive circuit 7 is held by the yoke plate 741 of the second yoke 74 holding the second magnet 721. Also, in the second magnetic drive circuit 7, the third magnet 821 of the third magnetic drive circuit 8 is held by the yoke plate 742 of the second yoke 74 holding the second magnet 722. Therefore, since the number of yoke plates can be reduced, the number of parts can be reduced, and the weight of the actuator 1 can be reduced. Further, the height (dimension in the Z direction) of the actuator 1 can be compressed.

OTHER EMBODIMENTS

In the second embodiment, one first magnet 622 is used for the first magnetic drive circuit 6, and one third magnet 821 is used for the third magnetic drive circuit 8. However, as in the first embodiment, the first magnets 621 and 622 may be disposed on both sides of the first coil 61 in the Z direction in the first magnetic drive circuit 6, and the third magnets 821 and 822 may be disposed on both sides of the third coil 81 in the Z direction in the third magnetic drive circuit 8.

In the above first and second embodiments, the elastic members 4 (viscoelastic members) are disposed on both sides of the movable body 3 in the Z direction. However, the elastic members 4 (viscoelastic members) may be disposed on both sides of the movable body 3 in the X direction and on both sides of the movable body 3 in the Y direction. Further, in the above first and second embodiments, the gel damper member is used as the elastic member 4. However, rubber or a spring may be used as the elastic member 4. As a gel member (gel damper member), a silicone-based gel can be shown as an example. More specifically, as the elastic member 4, a silicone-based gel having a penetration of 10 degrees to 110 degrees can be used. The penetration degree is defined in JIS-K-2207 and JIS-K-2220, and means that the smaller the value, the harder it is.

Viscoelasticity is a property of both viscosity and elasticity, and is a characteristic property of a polymer material such as a gel member, a plastic material, and a rubber material. Accordingly, as the elastic member 4 having viscoelasticity, various rubber materials such as natural rubber, diene rubber (for example, styrene-butadiene rubber, isoprene rubber, butadiene rubber, chloroprene rubber, acrylonitrile-butadiene rubber, or the like), non-diene rubber (for example, butyl rubber, ethylene propylene rubber, ethylene propylene diene rubber, urethane rubber, silicone rubber, fluorine rubber, or the like), and thermoplastic elastomer, and a modified material thereof may be used.

In the above first and second embodiments, in connecting both surfaces of the first elastic member 41 in the Z direction with the movable body 3 and the first end plate 28 by adhesion, and connecting both surfaces of the second elastic member 42 in the Z direction with the movable body 3 and the second end plate 29 by adhesion, the elastic member 4 (the first elastic member 41 and the second elastic member 42) is in a state of being compressed in the Z direction between the support 2 and the movable body 3. Therefore, since the elastic member 4 reliably follows the movement of the movable body 3, the resonance of the movable body 3 can be effectively prevented.

In the first and second embodiments, the coils and the coil holders are provided on the support 2, and the magnets and the yokes are provided on the movable body 3. However, the present invention may be applied to the case where the coils and the coil holders are provided on the movable body 3 and the magnets and the yokes are provided on the support 2.

INDUSTRIAL APPLICABILITY

In the present invention, the movable range in the second direction and the third direction of the movable body with respect to the support is regulated by the stopper mechanism configured between the first coil holder and the first magnet, and the stopper mechanism configured between second coil holder and second magnet, and such stopper mechanisms can be provided at positions overlapping with the first magnetic drive circuit and the second magnetic drive circuit in the first direction. Therefore, it is possible to reduce the planar area of the actuator when viewed from the first direction. In the present invention, the first magnet used in the first magnetic drive circuit for driving the movable body in the second direction has the dimension in the third direction shorter than the dimension in the second direction. Therefore, the stopper mechanism to regulate the movable range in the third direction of the movable body is configured by utilizing the space on both sides of the first magnet in the third direction. Further, the second magnet used for the second magnetic drive circuit for driving the movable body in the third direction has the dimension in the second direction shorter than the dimension in the third direction. Therefore, the stopper mechanism to regulate the movable range in the second direction of the movable body is configured by utilizing the spaces on both sides in the second direction of the second magnet. Therefore, it is easy to provide the stopper mechanisms at positions overlapping with the first magnetic drive circuit and the second magnetic drive circuit in the first direction.

The invention claimed is:

1. An actuator comprising:
    a support;
    a movable body movable with respect to the support;
    a first magnetic drive circuit which generates a driving force to drive the movable body in a second direction orthogonal to a first direction; and
    a second magnetic drive circuit which generates a driving force to drive the movable body in a third direction orthogonal to the first direction and crossing the second direction,
    wherein the first magnetic drive circuit comprises:
        a first coil, held by a first coil holder provided on one side member of the support and the movable body; and
        a first magnet, held by other side member of the support and the movable body, and facing, in the first direction, a first effective side portion extending in the third direction of the first coil,
    wherein the second magnetic drive circuit comprises:
        a second coil, held by a second coil holder provided on the one side member; and
        a second magnet, held by the other side member and facing, in the first direction, a second effective side portion extending in the second direction of the second coil,
    wherein the first coil holder comprises a first stopper portion facing the first magnet in the third direction to define a movable range of the movable body in the third direction, and
    wherein the second coil holder comprises a second stopper portion facing the second magnet in the second direction to define a movable range of the movable body in the second direction.

2. The actuator according to claim 1, wherein
the first coil holder comprises a first frame portion having a first opening in which the first coil is housed,
the first stopper portion comprises a portion which projects from the first frame portion in the first direction and faces the first magnet in the third direction,
the second coil holder comprises a second frame portion having a second opening in which the second coil is housed, and
the second stopper portion comprises a portion which projects from the second frame portion in the first direction and faces the second magnet in the second direction.

3. The actuator according to claim 2, wherein
the first coil holder comprises a first seat portion which projects from the first frame portion in the first direction and supports a first invalid side portion extending in the second direction of the first coil,
the first stopper portion is constituted by a side end portion facing the first magnet of the first seat portion in the third direction,
the second coil holder comprises a second seat portion which projects from the second frame portion in the first direction and supports a second invalid side portion extending in the third direction of the second coil, and
the second stopper portion is constituted by a side end portion facing the second magnet of the second seat portion in the second direction.

4. The actuator according to claim 3, wherein
the first stopper portion is positioned closer to the first magnet than an inner edge of the first invalid side portion, and
the second stopper portion is positioned closer to the second magnet than an inner edge of the second invalid side portion.

5. The actuator according to claim 2, wherein
the thickness of the first frame portion in the first direction is greater than the thickness of the first coil in the first direction, and
the thickness of the second frame portion in the first direction is greater than the thickness of the second coil in the first direction.

6. The actuator according to claim 1, wherein
the first magnetic drive circuit is arranged to overlap with the second magnetic drive circuit in the first direction.

7. The actuator according to claim 6, wherein
a third magnetic drive circuit that generates a driving force to drive the movable body in the second direction is arranged to overlap with the second magnetic drive circuit on an opposite side to the first magnetic drive circuit with respect to the second magnetic drive circuit,
wherein the third magnetic drive circuit comprises:
a third coil, held by a third coil holder provided on the one side member; and
a third magnet, held by the other side member and facing, in the first direction, a third effective side portion extending in the third direction of the third coil, and
wherein the third coil holder comprises a third stopper portion facing the third magnet in the third direction to define a movable range of the movable body in the third direction.

8. The actuator according to claim 1, wherein
the one side member is the support, and
the other side member is the movable body.

9. The actuator according to claim 1, further comprising:
a first elastic member and a second elastic member provided between the movable body and the support,
the first elastic member in contact with both the movable body and a portion of the support opposed to the movable body on one side in the first direction, and
the second elastic member in contact with both the movable body and a portion of the support opposite to the movable body on the other side in the first direction.

10. The actuator according to claim 9, wherein
each of the first elastic member and the second elastic member are adhered to the support and the movable body.

11. The actuator according to claim 9, wherein
each of the first elastic member and the second elastic member is in a compressed state in the first direction between the support and the movable body.

12. The actuator according to claim 9, wherein
each of the first elastic member and the second elastic member is a viscoelastic member.

13. The actuator according to claim 4, further comprising:
a first elastic member and a second elastic member provided between the movable body and the support,
the first elastic member in contact with both the movable body and a portion of the support opposed to the movable body on one side in the first direction, and
the second elastic member in contact with both the movable body and a portion of the support opposite to the movable body on the other side in the first direction.

14. The actuator according to claim 13, wherein
each of the first elastic member and the second elastic member are adhered to the support and the movable body.

15. The actuator according to claim 13, wherein
each of the first elastic member and the second elastic member is in a compressed state in the first direction between the support and the movable body.

16. The actuator according to claim 13, wherein
each of the first elastic member and the second elastic member is a viscoelastic member.

17. The actuator according to claim 6, further comprising:
a first elastic member and a second elastic member provided between the movable body and the support,
the first elastic member in contact with both the movable body and a portion of the support opposed to the movable body on one side in the first direction, and
the second elastic member in contact with both the movable body and a portion of the support opposite to the movable body on the other side in the first direction.

18. The actuator according to claim 17, wherein
each of the first elastic member and the second elastic member are adhered to the support and the movable body.

19. The actuator according to claim 17, wherein
each of the first elastic member and the second elastic member is in a compressed state in the first direction between the support and the movable body.

20. The actuator according to claim 17, wherein
each of the first elastic member and the second elastic member is a viscoelastic member.

* * * * *